United States Patent [19]
Ida et al.

[11] Patent Number: 5,224,871
[45] Date of Patent: Jul. 6, 1993

[54] CLOCK SPRING CONNECTOR

[75] Inventors: Yuichi Ida, Miyagi; Hironori Kato, Sendai; Kunihiko Sasaki, Miyagi; Hiroyuki Bannai, Furukawa, all of Japan

[73] Assignee: Alps Electric Co., Ltd., Tokyo, Japan

[21] Appl. No.: 873,921

[22] Filed: Apr. 24, 1992

[30] Foreign Application Priority Data

| Apr. 30, 1991 | [JP] | Japan | 3-124480 |
| Apr. 30, 1991 | [JP] | Japan | 3-124481 |
| Apr. 30, 1991 | [JP] | Japan | 3-124499 |
| May 8, 1991 | [JP] | Japan | 3-131610 |
| May 31, 1991 | [JP] | Japan | 3-156110 |

[51] Int. Cl.$^5$ ............................................. H01R 39/02
[52] U.S. Cl. ............................................. 439/164; 439/15
[58] Field of Search ................................... 439/15, 164

[56] References Cited

U.S. PATENT DOCUMENTS

| 3,466,588 | 9/1969 | Bradshaw | 439/164 |
| 3,763,455 | 10/1973 | Confer | |
| 4,540,223 | 9/1985 | Schmerda | |
| 5,026,289 | 6/1991 | Matsumoto | |
| 5,046,951 | 9/1991 | Suzuki | |

Primary Examiner—Eugene F. Desmond
Attorney, Agent, or Firm—Guy W. Shoup; Patrick T. Bever

[57] ABSTRACT

Disclosed is a clock spring connector having: a fixed member; a movable member so mounted as to be rotatable relative to the fixed member; and a flexible cable for connecting the fixed member to the fixed member, the flexible cable being accommodated in between an inner cylindrical unit provided in any one of the fixed member and the movable member and an outer cylindrical unit provided in the other member and reversely wound on the inner and outer cylindrical units through a U-shaped turned-back portion. In this clock spring connector, a plurality of rollers connected by a wire spring to which an inward elastic biasing force is imparted are mounted outwardly of the flexible cable wound on the inner cylindrical unit. The flexible cable is press-biased towards the outer peripheral surface of the inner cylindrical unit by these rollers.

22 Claims, 29 Drawing Sheets

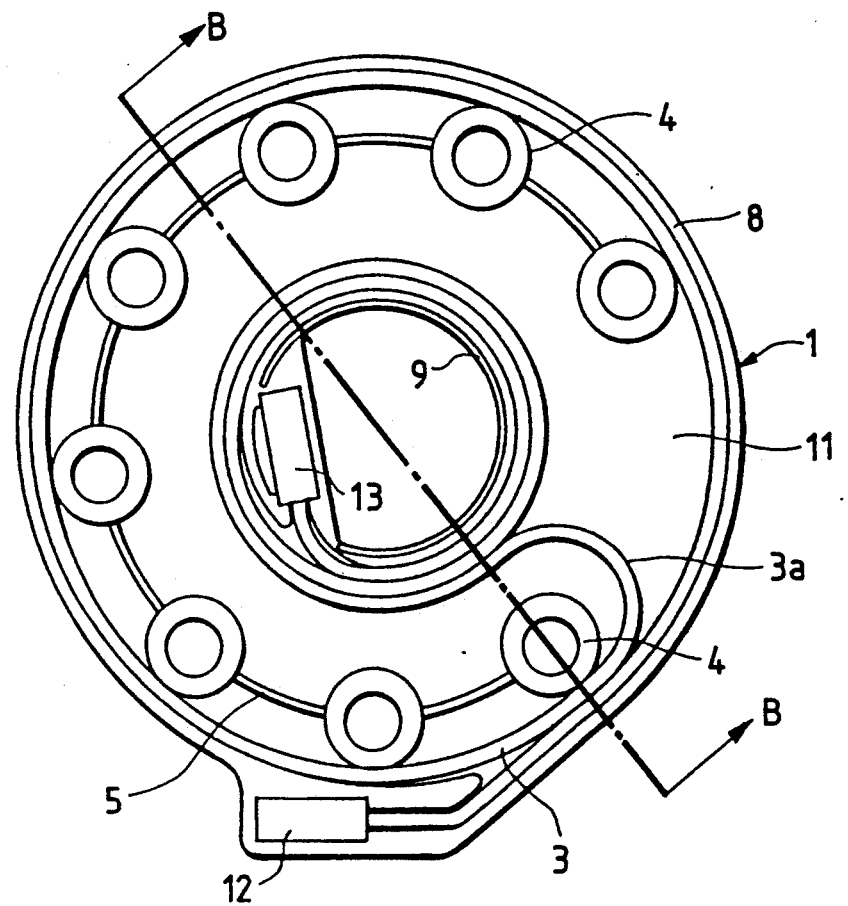
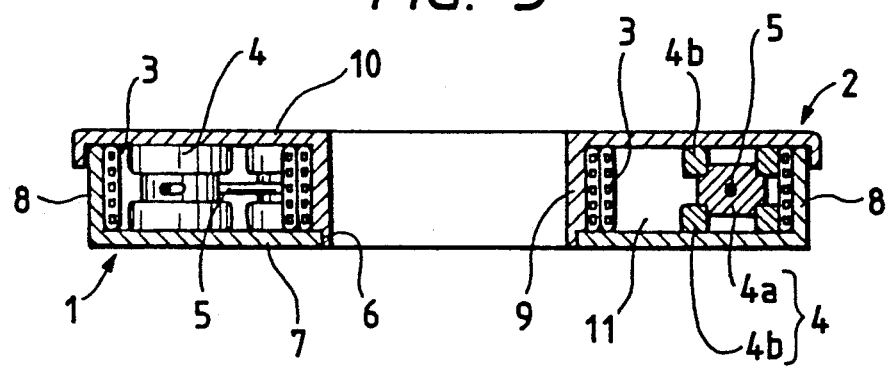

CLOCK SPRING CONNECTOR

BACKGROUND OF THE INVENTION

1. Field of the Invention

The present invention relates to a clock spring connector applied to a steering device or the like of an automobile, wherein an electrical connection between a fixed member and a movable member is performed by use of a flexible cable.

2. Related Background Art

In a clock spring connector, a fixed member is connected through a flexible cable to a movable member so mounted as to be rotatable relative to this fixed member. The clock spring connector is employed as an electrical connecting means between the fixed member and the movable member having a finite number of revolutions as in the case of a steering device of an automobile.

In this type of clock spring connector, the flexible cable is high in terms of percentage of occupying the total costs. Proposed in the specification of U.S. Pat. No. 3,763,455 is a clock spring connector constructed to reduce the costs by decreasing a length of a flexible cable needed.

FIG. 53 is a plan view schematically illustrating a construction of the clock spring connector disclosed in the aforementioned patent specification. As shown in the same Figure, a movable member 101 is so mounted as to be rotatable relative to a cylindrical fixed member 100. Flexible cables 103, 104 are housed in an ring-like air space 102 defined by the fixed member 100 and the movable member 101. These flexible cables 103, 104 are led to the outside of the air space 102 in such a state that the cables are fixed respectively to the fixed member 100 and the movable member 101. The flexible cables are accommodated in the air space 102 in a state where the cables are wound on an outer cylindrical unit of the fixed body 100 and on an inner cylindrical unit of the movable member 101 in winding directions reverse to each other. A U-shaped turned-back portion is formed in the position where the winding direction is turned back. Further, groups of a plurality of rollers 105, 106 are disposed in the peripheral direction in the air space 102. The turned-back portion of the flexible cable 103 is looped with one group of the rollers 105, while the turned-back portion of the flexible cable 104 is looped with the other group of the rollers 106.

In the thus constructed clock spring connector, when, e.g., the movable member 101 is rotated clockwise in FIG. 53, the turned-back portions of the flexible cables 103, 104 also move in the peripheral direction of the air space 102. The flexible cables 103, 104 are rewound on the outer cylindrical unit of the fixed member 100 in a denser winding state. In reverse to this, when the movable member 101 is rotated counterclockwise in FIG. 26, the turned-back portions of the flexible cables 103, 104 also move in the same direction. The flexible cables 103, 104 are tightly wound on the inner cylindrical unit of the movable member 101 more densely. Note that during such a tight-wind or rewind operation, the respective rollers 105, 106 undergo the force given from the turned-back portions of the flexible cables 103, 104 and thereby move in the same direction.

According to the clock spring connector in the conventional example described above, the winding directions of the flexible cables are reversed with respect to the inner and outer cylindrical units. Hence, the lengths of the flexible cables required can be remarkably decreased as well as reducing the costs as compared with such a clock spring connector in which the flexible cables are wound (in an eddy state) on the inner and outer cylindrical units in the same direction. Besides, the plurality of rollers are disposed between the inner cylindrical unit wound with the flexible cable and the outer cylindrical unit wound with the flexible cable. The flexible cables can be thereby regulated in the radial direction over the entire periphery of the ring-like air space. The tight-wind or rewind operation can be performed smoothly.

However, a dimension (indicated by the symbol L in FIG. 53) between the flexible cable wound on the inner cylindrical unit and the flexible cable wound on the outer cylindrical unit fluctuates depending on the winding states of the flexible cables. The dimension L becomes maximum when all the flexible cables are rewound on the outer cylindrical unit having a larger diameter. Whereas if all the flexible cables are wound tightly on the inner cylindrical unit having a smaller diameter, the dimension L becomes minimum. For this reason, even when the plurality of rollers are closely disposed in the air space on the assumption that the dimension L is minimum, and if the flexible cable is rewound on the outer cylindrical unit from the inner cylindrical unit, backlashes are produced between the respective rollers and the outermost peripheral portion of the flexible cable wound on the inner cylindrical unit. Therefore, when rotating the movable member in the rewinding direction in such a state, the flexible cable wound on the inner cylindrical unit can not be fed out towards the turned-back portion. In some cases, the flexible cable may swell outwards (towards the outer cylindrical unit) in the radial direction during the course of that process. In reverse to this, when rotating the movable member in the tight-winding direction, the flexible cable wound on the outer cylindrical portion can not be fed out to the turned-back portion. In some cases, the flexible cable may swell inwards (towards the inner cylindrical unit) in the radial direction during the course of that process. In any case, this swollen portion is buckled due to further rotations of the movable member, resulting in such a problem that the flexible cable is damaged.

In addition, although the force to cause the rotation in the same direction acts on all the rollers because of the contact with the flexible cable, the respective rollers rotate in the directions opposite to each other in such a way that the adjacent rollers contact each other. Consequently, the rotations of the rollers are offset. For this reason, during the tight-wind or rewind operation, the rotations of the roller looped with the turned-back portion are deteriorated on undergoing an influence of the next roller adjacent thereto. This leads to a problem in which the flexible cable wound on the outer or inner cylindrical unit can not be fed out smoothly via the turned-back portion.

SUMMARY OF THE INVENTION

It is a primary object of the present invention to provide a highly reliable clock spring connector capable of preventing buckling of a flexible cable and causing smooth rotations.

A clock spring connector according to the present invention includes an elastic member for press-biasing a flexible cable substantially over an entire periphery of an inner cylindrical unit. Therefore, even when rotating a movable member in a rewind direction, the flexible cable wound on the inner cylindrical unit is surely fed out to an outer cylindrical unit through a turned-back portion. The flexible cable is not buckled on the way to the turned-back portion. Besides, the clock spring connector of this invention includes an elastic member for press-biasing the flexible cable substantially over the entire periphery of the outer cylindrical unit. Hence, even when rotating the movable member in a tight-wind direction, the flexible cable wound on the outer cylindrical unit is surely fed out to the inner cylindrical unit through the turned-back portion. The flexible cable is not buckled on the way to the turned-back portion. Further, the clock spring connector of this invention includes an elastic member, disposed inwardly of the turned-back portion of the flexible cable, for biasing the turned-back portion outwards. The flexible cable can be thereby surely fed out through the turned-back portion by the frictional force caused with respect to this elastic member. Moreover, the clock spring connector of this invention includes a pair of press members connected by the elastic member. The flexible cable is press-biased to the cylindrical unit on the side of the movable member by means of these press members. Hence, the turned-back portion is pressed by the press member which revolves with the same rotational quantity as that of the movable member. The flexible cable can be smoothly fed out through the turnedback portion.

BRIEF DESCRIPTION OF THE DRAWINGS

Other objects and advantages of the present invention will become apparent during the discussion taken in conjunction with the accompanying drawings, in which:

FIG. 4 is a perspective view illustrating the clock spring connector in a second embodiment of the present invention, wherein an upper case is partly omitted;

FIG. 5 is a sectional view taken substantially along the line B—B of FIG. 4;

DETAILED DESCRIPTION OF THE PREFERRED EMBODIMENTS

Figure 1:
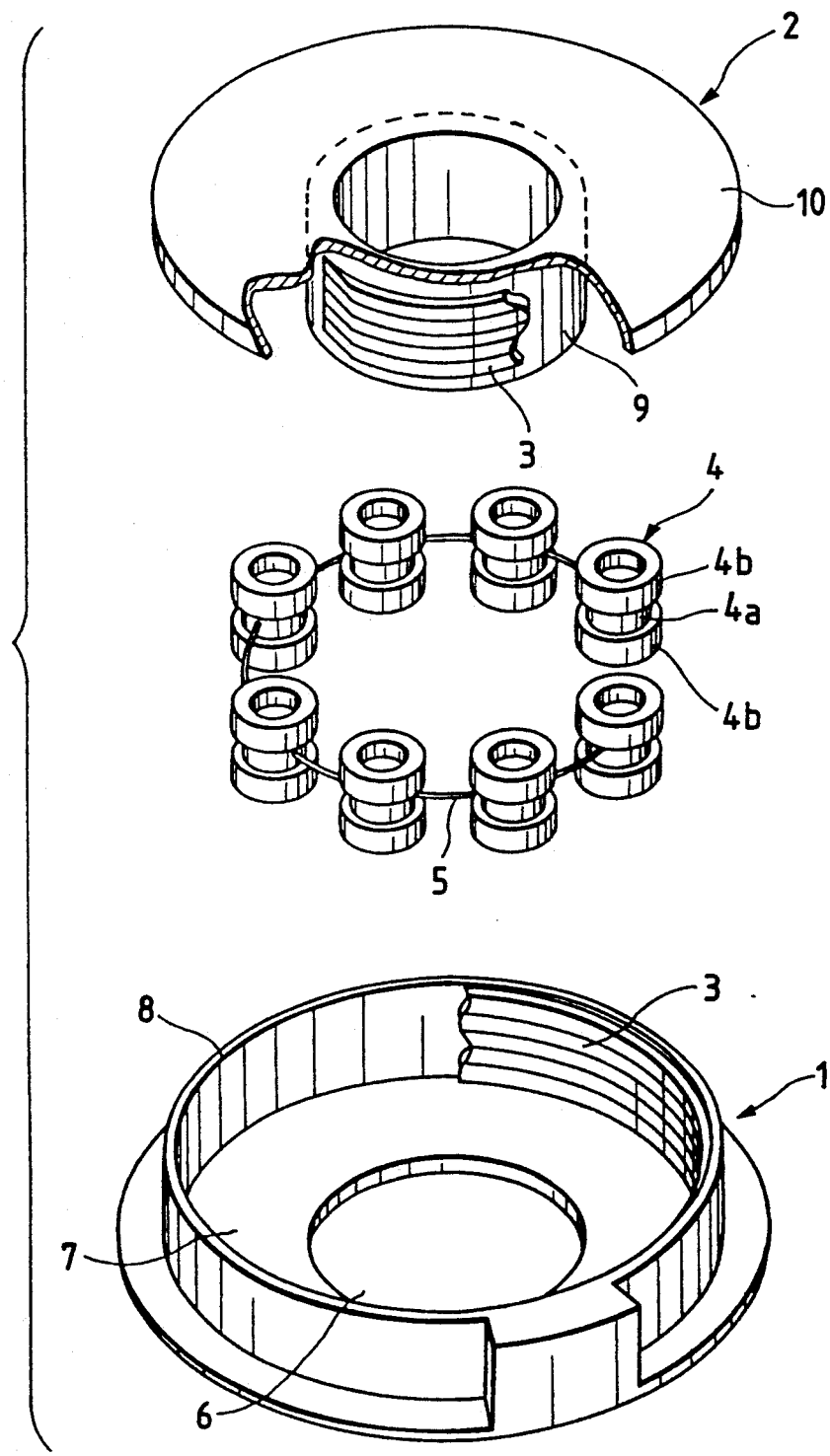
FIG. 1 is an exploded perspective view illustrating a clock spring connector with some portions broken away in a first embodiment of the present invention.
Figure 2:
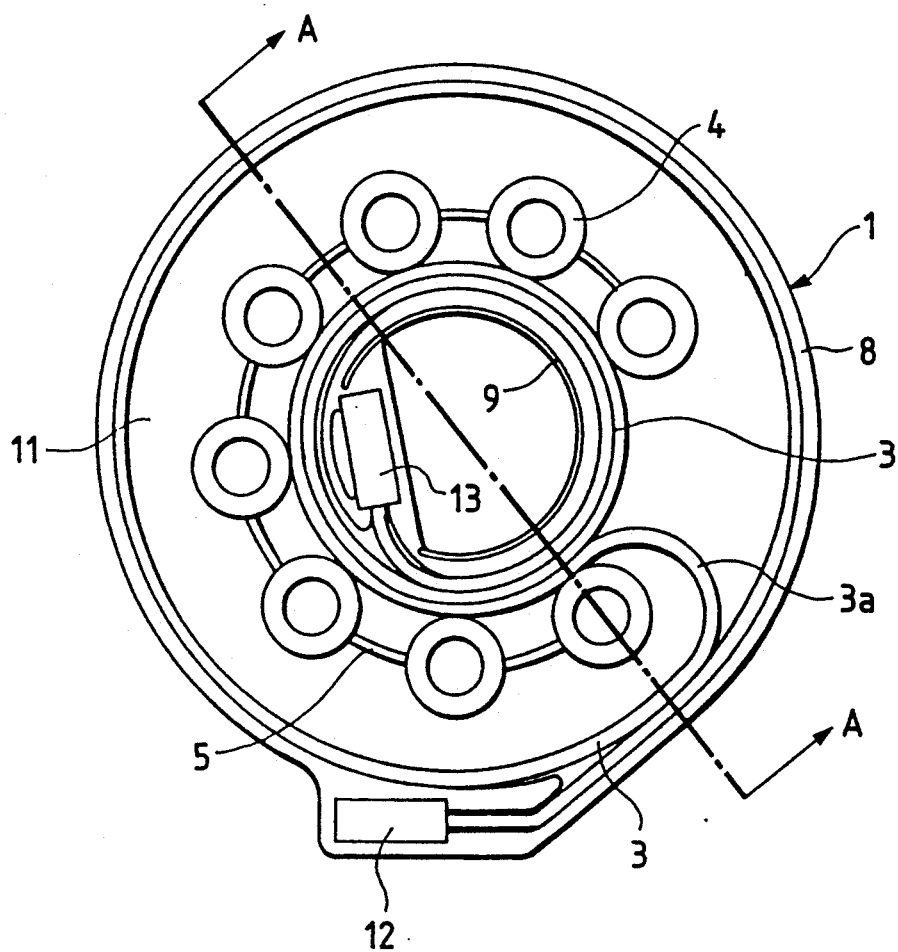
FIG. 2 is a plan view depicting the clock spring connector, wherein an upper case is partly omitted.
Figure 3:
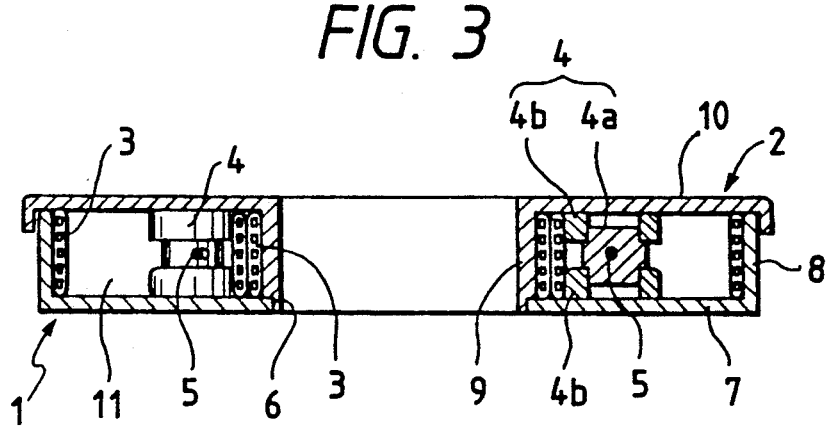
FIG. 3 is a sectional view taken substantially along the line A—A of FIG. 2.

FIG. 1 is an exploded perspective view illustrating a clock spring connector with some portions broken away in a first embodiment of the present invention. FIG. 2 is a plan view depicting the clock spring connector, wherein an upper case is partly omitted. FIG. 3 is a sectional view taken substantially along the line A—A of FIG. 2.

As illustrated in theses Figures, the clock spring connector in accordance with this embodiment is constructed substantially of a lower case 1, an upper case 2 so mounted as to be rotatable relative to this lower case 1; a flexible cable 3 accommodated in between the two cases 1, 2, a plurality of rollers disposed in an area defined by this flexible cable 3 and a C-shaped wire spring 5 for connecting these rollers 4.

The lower case 1 includes a bottom plate 7 bored with a center hole 6 at its center and an outer cylindrical unit 8 standing erect along the outer periphery of this bottom plate 7. The lower case 1 assumes a bottomed cylindrical configuration on the whole. On the other hand, the upper case 2 includes a top plate 10 having its central part from which an inner cylindrical unit 9 is provided pendently. The inner cylindrical member 9 is guided by the center hole 6, and an outer circumference of the top plate 10 is guided by the outer cylindrical unit 8, whereby the upper case 2 is so connected as to be rotatable relative to the lower case 1. An air space 11 assuming a ring-like shape in plan is defined by the bottom plate 7 and the outer cylindrical unit 8 of the lower case 1 and by the top plate 10 and the inner cylindrical unit 9 of the upper case 2.

The flexible cable 3 is composed of a so-called flat cable formed by laminating conductors parallel to each other with a pair of insulating films. This embodiment involves the use of a flat cable in which five conductors are embedded. As illustrated in FIG. 2, one end of the flexible cable 3 is connected to a first connector 12 fixed to the outer cylindrical unit 8 and further led to the outside of the lower case 1 through the first connector 12. On the other hand, the other end of the flexible cable 3 is connected to a second connector 13 fixed to the inner cylindrical unit 9 and further led to the outside of the outside of the upper case 2 through the second connector 13. Besides, the flexible cable 3 is wound counterclockwise on an inner wall of the outer cylindrical unit 8 from the first connector 12. The flexible cable 3 is turned around in a U-like shape (which will hereinafter be referred to as a turned-back portion 3a) The flexible cable 3 is further wound clockwise around the outer wall and is accommodated into the air space 11 so that the cable reaches the second connector 12.

A roller 4 is, as obvious from FIG. 3, composed of a circular cylindrical part 4a and rotary parts 4b rotatably supported at two vertical ends thereof. A plurality of rollers 4 are disposed at constant intervals in the peripheral direction within the air space 11. The wire spring formed in the C-shape penetrates the respective circular cylindrical parts 4a, whereby these rollers 4 are connected so as not to separate from each other. The rollers are so biased as to press-contact the outer peripheral surface of the inner cylindrical unit 9 by dint of an inward elastic biasing force of the wire spring 5. Note that the turned-back portion 3a of the flexible cable 3 loops around the roller connected to one end of the wire spring 5.

Next, the operation of the clock spring connector in accordance with the embodiment described above will be explained taking an example where the lower case 1 is used as a fixed member, while the upper case 2 is employed as a movable member. To start with, when the upper case 2 is rotated clockwise from the state shown in FIG. 2, the turned-back portion 3a of the flexible cable 3 moves clockwise by a rotational quantity smaller than the upper case 2, and the flexible cable 3 having a length equivalent to the above-mentioned moving quantity is led out of the outer cylindrical unit 8 and tightly wound on the inner cylindrical member 9. In this case, the turned-back portion 3a of the flexible cable 3 forces the one end roller 4 to move clockwise by dint of a small frictional resistance therewith, with the result that all the rollers 4 move clockwise as they remain connected to the wire spring 5. Therefore, with the respective rollers 4 which move in this manner, the flexible cable 3 wound on the outer cylindrical unit 8 is prevented from swell-biasing in the inner radial direction. The flexible cable 3 on the side of the outer cylindrical unit 8 is smoothly led out towards the turned-back portion 3a and tightly wound on the inner cylindrical unit 9.

In reverse to the above-mentioned, when the upper case 2 is rotated counterclockwise from the position illustrated in FIG. 2, the turned-back portion 3a of the flexible cable 3 moves counterclockwise by a rotational quantity smaller than the upper case 2. The flexible cable 3 having a length equivalent to the moving quantity is led out of the inner cylindrical unit 9 and rewound on the outer cylindrical unit 8. In this case, the turned-back portion 3a of the flexible cable 3 forces the roller 4 opposite to the roller 4 looped with the turned-back portion 3a to move counterclockwise. The respective rollers 4 are also biased in the central direction of the inner cylindrical unit 9 by the elastic force of the wire spring 5, with the result that all the rollers 4 roll counterclockwise on the flexible cable 3 wound on the inner cylindrical unit 9 as they are connected to the wire spring 5. Hence, with the respective rollers which move while being elastically biased inwards, the flexible cable 3 wound on the inner cylindrical unit 9 is prevented from swell-biasing outwards in the radial direction. The flexible cable on the side of the inner cylindrical unit 9 is smoothly fed out towards the turned-back portion 3a and rewound on the outer cylindrical unit 8.

In the clock spring connector in accordance with the first embodiment, the flexible cable 3 is wound reversely on the outer and inner cylindrical units 8, 9 through the turned-back portion 3a. It is therefore possible to reduce the length of the flexible cable 3 required, as a result of which the total costs can be reduced. At the same time, this gives an advantage for miniaturization. Further, the plurality of rollers 4 are interposed between the flexible cable 3 wound on the outer cylindrical unit 8 and the one wound on the inner cylindrical unit 9. These rollers 4 are connected to the wire spring 5 and move following up the turned-back portion 3a while keeping the constant intervals. Hence, during the tight-wind or rewind operation, the rotating force of the upper case 2 is surely transmitted to the turned-back portion 3a of the flexible cable 3, thereby preventing such an inconvenience that the flexible cable 3 swells in the radial direction and is buckled on the way to the turned-back portion 3a. In particular, the flexible cable 3 wound on the inner cylindrical unit 9 is elastically biased towards the outer peripheral surface of the inner cylindrical unit 9 substantially over the entire periphery by the respective rollers 4. Therefore, during the rewind operation, the flexible cable 3 wound on the inner cylindrical unit 9 does not swell outwards in the radial direction at all. The buckling preventive effect of the flexible cable 3 during the rewind operation is conspicuous. Further, the two rollers 4a, 4b confront each other through the turned-back portion 3a of the flexible cable 3, and hence the frictional resistances between the turned-back portion 3a and the rollers 4 can be decreased. As a result, it is feasible to smoothly move the turned-back portion 3a and surely perform the tight-wind or rewind operation irrespective of the rotational directions of the upper case 2.

Figure 6:
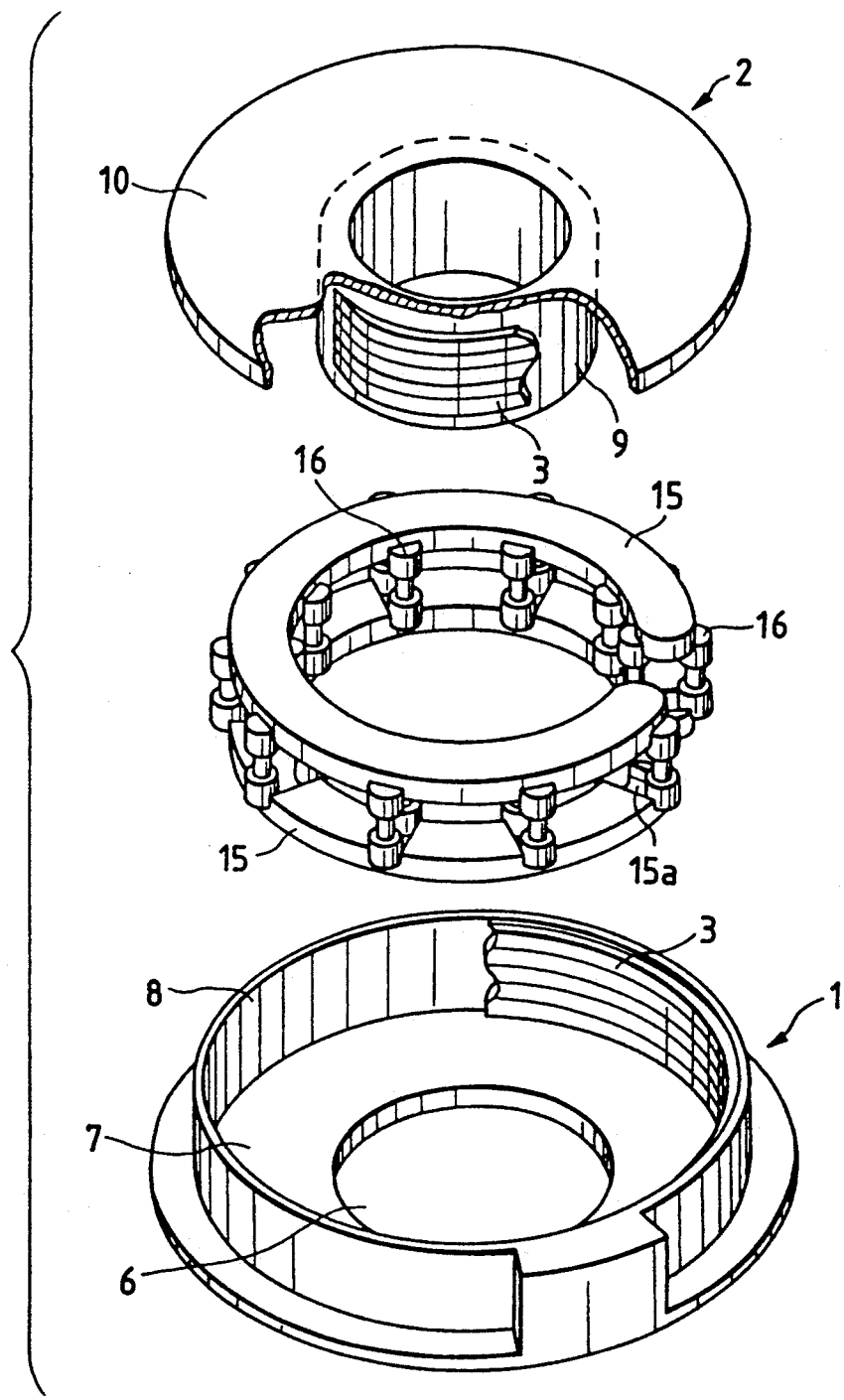
FIG. 6 is an exploded perspective view illustrating the clock spring connector with some portions broken away in a third embodiment of the present invention.
Figure 7:
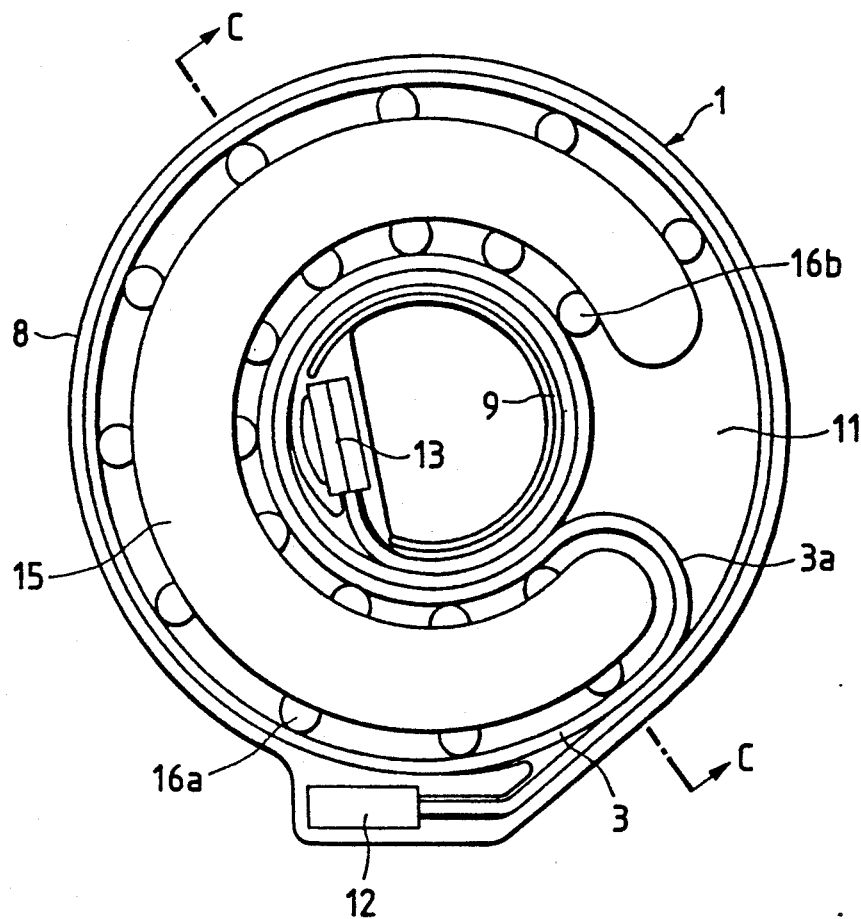
FIG. 7 is a plan depicting the clock spring connector, wherein an upper case is partly omitted.
Figure 8:
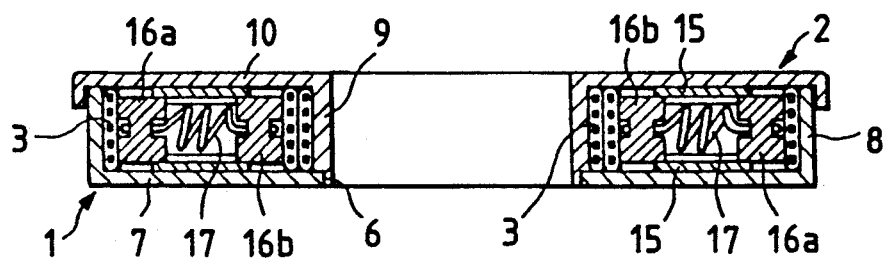
FIG. 8 is a sectional view taken substantially along the line C—C of FIG. 7.
Figure 9:
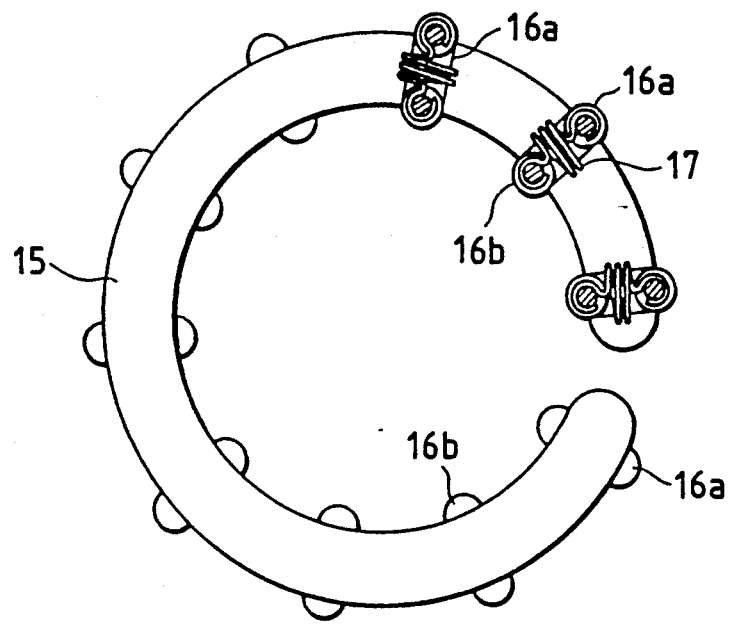
FIG. 9 is a plan view illustrating a connecting member with some portions broken away which is provided in the clock spring connector of FIG. 7.

FIGS. 6-9 are associated with a third embodiment of the present invention. FIG. 6 is an exploded perspective view illustrating a clock spring connector with some portions broken away. FIG. 7 is a plan view depicting the clock spring connector, wherein an upper case is partly omitted. FIG. 8 is a sectional view taken substantially along the line C—C of FIG. 7. FIG. 9 is a plan view illustrating a connecting member with some portions broken away which is provided in the clock spring connector.

As depicted in FIGS. 6-9, the clock spring connector in accordance with this embodiment is constructed substantially of a lower case 1, an upper case 2 so mounted as to be rotatable relative to this lower case 1; a flexible cable 3 accommodated in between the two cases 1, 2; connecting members 15 interposed between the flexible cables 3; a plurality of rollers 16 held by these connecting members 15; and springs 17.

As similar to the first embodiment, the lower case 1 includes a bottom plate 7 bored with a center hole 6 at its center and an outer cylindrical unit 8 standing erect along the outer periphery of this bottom plate 7. The lower case 1 assumes a bottomed cylindrical configuration on the whole. On the other hand, the upper case 2 includes a top plate 10 having its central part from which an inner cylindrical unit 9 is provided pendently. The inner cylindrical member 9 is guided by the center hole 6, and an outer circumference of the top plate 10 is guided by the outer cylindrical unit 8, whereby the upper case 2 is so connected as to be rotatable relative to the lower case 1. An air space 11 assuming a ring-like shape in plan is defined by the bottom plate 7 and the outer cylindrical unit 8 of the lower case 1 and by the top plate 10 and the inner cylindrical unit 9 of the upper case 2.

The flexible cable 3 is composed of a so-called flat cable formed by laminating conductors parallel to each other with a pair of insulating films. This embodiment involves the use of a flat cable in which five conductors are embedded. As illustrated in FIG. 7, one end of the flexible cable 3 is connected to a first connector 12 fixed to the outer cylindrical unit 8 and further led to the outside of the lower case 1 through the first connector 12. On the other hand, the other end of the flexible cable 3 is connected to a second connector 13 fixed to the inner cylindrical unit 9 and further led to the outside of the outside of the upper case 2 through the second connector 13. Besides, the flexible cable 3 is wound counterclockwise on an inner wall of the outer cylindrical unit 8 from the first connector 12. The flexible cable 3 is turned around in a U-like shape. The flexible cable 3 is further wound clockwise around the outer wall and is accommodated into the air space 11 so that the cable reaches the second connector 12.

The pair of connecting members 15 assuming a C-shape in plan are disposed opposite to each other at a predetermined spacing within the air space 11. Guide grooves 15a extending in the radial directions are formed in the inner confronting surfaces of these connecting members 15 while keeping constant intervals in the peripheral direction. The paired rollers 16 are so disposed in the respective guide grooves 15a as to be retractable through springs 17. Therefore, the respective rollers 16 (which will hereinafter be marked with 16a) protruding from the outer peripheral edges of the connecting members 15 are elastically biased outwards in the radial direction, i.e., towards the inner peripheral surface of the outer cylindrical unit 8 by means of the springs 17. The respective rollers 16 (which will hereinafter be marked with 16b) protruding from the inner peripheral edges of the connecting members 15 are elastically biased inwards in the radial direction, viz., towards the outer peripheral surface of the inner cylindrical unit 9. Note that the turned-back portion 3a of the flexible cable 3 loops around the peripheral surface of one end of the connecting member 15.

In the third embodiment, to start with, when the upper case 2 is rotated clockwise from the state shown in FIG. 7, the turned-back portion 3a of the flexible cable 3 moves clockwise by a rotational quantity smaller than the upper case 2, and the flexible cable 3 having a length equivalent to the above-mentioned moving quantity is led out of the outer cylindrical unit 8 and tightly wound on the inner cylindrical member 9. In this case, the turned-back portion 3a of the flexible cable 3 forces the connecting member 15 to move clockwise while contacting the one end peripheral surface thereof with a relatively small frictional resistance. The individual rollers 16a, 16b are biased towards the outer and inner cylindrical units, 8, 9 by dint of the elastic forces of the springs 17. A group of rollers 16a move clockwise on the flexible cable 3 wound on the outer cylindrical unit 8 as they remain held by the connecting members 15, while a group of rollers 16b move clockwise on the flexible cable 3 wound on the inner cylindrical unit 9 as they remain held by the connecting members 15. Hence, with the group of these rollers 16a, the flexible cable 3 wound on the outer cylindrical unit 8 is prevented from swell-biasing in the inner radial direction. The flexible cable 3 on the side of the outer cylindrical unit 8 is smoothly led out towards the turned-back portion 3a and tightly wound on the inner cylindrical unit 9.

In reverse to the above-mentioned, when the upper case 2 is rotated counterclockwise from the position illustrated in FIG. 7, the turned-back portion 3a of the flexible cable 3 moves counterclockwise by a rotational quantity smaller than the upper case 2. The flexible cable 3 having a length equivalent to the moving quantity is led out of the inner cylindrical unit 9 and rewound on the outer cylindrical unit 8. In this case, the turned-back portion 3a of the flexible cable 3 forces the connecting member 15 to move counterclockwise while contacting the peripheral surface of the connecting member 15 looped with the turned-back portion 3a and the other end peripheral surface opposite thereto with relatively small frictional resistances. With this operation, the group of rollers 16a move counterclockwise on the flexible cable 3 wound on the outer cylindrical unit 8 as they remain held by the connecting members 15, while the group of rollers 16b move counterclockwise on the flexible cable 3 wound on the inner cylindrical unit 9 as they remain held by the connecting members 15. With the group of these rollers 16b, the flexible cable 3 wound on the inner cylindrical unit 9 is prevented from swell-biasing outwards in the radial direction. The flexible cable on the side of the inner cylindrical unit 9 is smoothly fed out towards the turned-back portion 3a and rewound on the outer cylindrical unit 8.

In the clock spring connector also in accordance with the third embodiment illustrated in FIGS. 6-9, as in the same way with the first and second embodiments discussed above, the flexible cable 3 is wound reversely on the outer and inner cylindrical units 8, 9 through the turned-back portion 3a. It is therefore possible to reduce the length of the flexible cable 3 required, as a result of which the total costs can be reduced. At the same time, this gives an advantage for miniaturization. Further, the flexible cable 3 wound on the outer cylindrical unit 8 is thrust towards the inner peripheral surface of the outer cylindrical unit 8 substantially over the entire periphery while contacting the group of rollers 16a elastically biased by the springs 17. Consequently, during the tight-wind operation, the flexible cable 3 wound on the outer cylindrical unit 8 does not swell inwards in the radial direction. Similarly, the flexible cable 3 wound on the inner cylindrical unit 9 is elastically biased towards the outer peripheral surface of the inner cylindrical unit 9 substantially over the entire periphery while contacting the group of rollers 16b elastically biased by the springs 17. Consequently, during the rewind operation, the flexible cable 3 wound on the inner cylindrical unit 9 does not swell outwards in the radial direction. Hence, when rotating the upper case in any direction, the rotating force thereof is surely transmitted to the turned-back portion 3a of the flexible cable 3. It is possible to prevent such an inconvenience that the flexible cable 3 swells in the radial direction and is buckled on the way to the turned-back portion 3a. Further, the flexible cable 3 is in contact with the respective rollers 16a, 16b with extremely small frictional resistances. It is therefore feasible to surely perform the tight-wind or rewind operation by smoothly moving the flexible cable 3.

In the foregoing first through third embodiments of the present invention, many variant forms are attainable and will hereinafter be described with reference to FIGS. 10-27.

For instance, the first and second embodiments have dealt with the case where the turned-back portion 3a of the flexible cable 3 is brought into contact with the rollers 4 provided at both ends and connected to the wire spring 5, whereby all the rollers 4 move in the peripheral direction while following up the motion of the turned-back portion 3a. As illustrated in the respective variant forms of FIGS. 10-12, however, a slide member is connected to the roller 4 looped with the turned-back portion 3a, with the flexible cable 3 being interposed therebetween. When the upper case 2 is rotated in any one direction, the turned-back portion 3a contacts the slide member so that the roller 4 looped with the turned-back portion 3a does not separate largely from the turned-back portion 3a.

Figure 10:
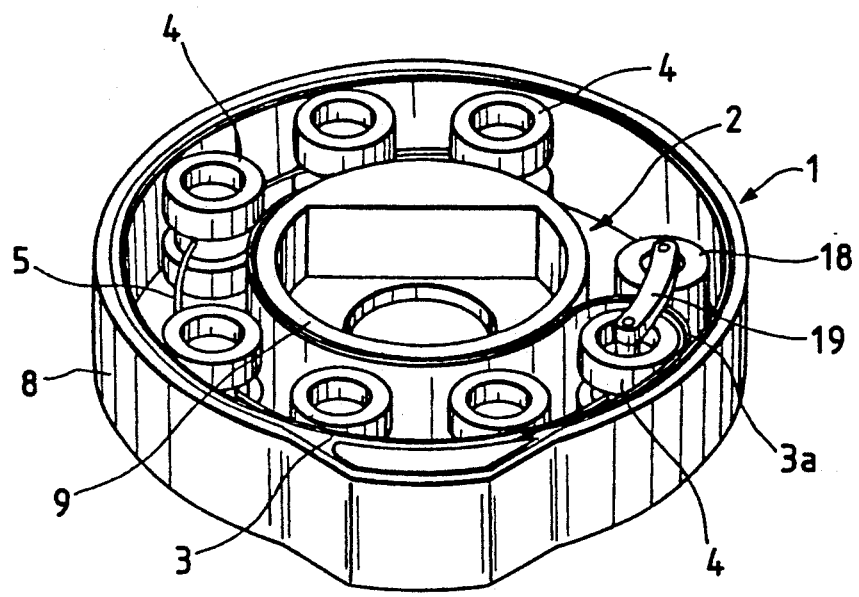
FIG. 10 is a perspective view of the clock spring connector, showing a variant form thereof.

FIG. 10 is a perspective view illustrating an embodiment wherein the slide member involves the use of a contact roller 18 connected via an arm 19 to the roller 4 looped with the turned-back portion 3a. In this case, the turned-back portion 3a contacts the roller 4 or the contact roller 18 with a small frictional resistance in accordance with the rotational directions of the upper case 2, thereby smoothing the movement of the turned-back portion 3a in the peripheral direction. Besides, the contact roller 18 is capable of oscillating in the radial directions with the aid of the arm 19. The contact roller 18 is oscillated and biased towards the inner cylindrical unit 9 when the flexible cable 3 is wound densely on the outer cylindrical unit 8 but towards the outer cylindrical unit 8 when being wound densely on the inner cylindrical unit 8. The turned-back portion 3a can be thereby surely guided.

Figure 11:
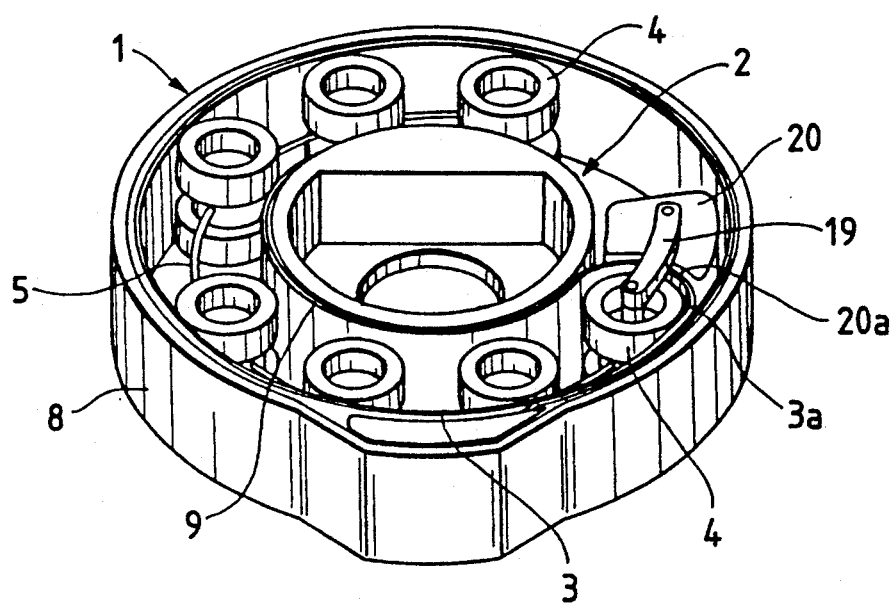
FIG. 11 is a perspective view of the clock spring connector, showing another variant form thereof.

FIG. 11 is a perspective view showing an embodiment wherein the slide member involves the use of a curved member 20 having a recessed peripheral surface 20a. The curved member 20 has its peripheral surface 20a so connected to the one end roller 4 by means of the arm 19 as to confront the roller 4 through the turned-back portion 3a. In this case, the frictional resistance between the turned-back portion 3a and the curved member 20 is somewhat larger than with the contact roller 18 shown in FIG. 10. Nevertheless, the U-shaped turned-back portion 3a is held by the peripheral surface 20a, thereby making it possible to surely prevent a deformation of the turned-back portion 3a.

Figure 12:
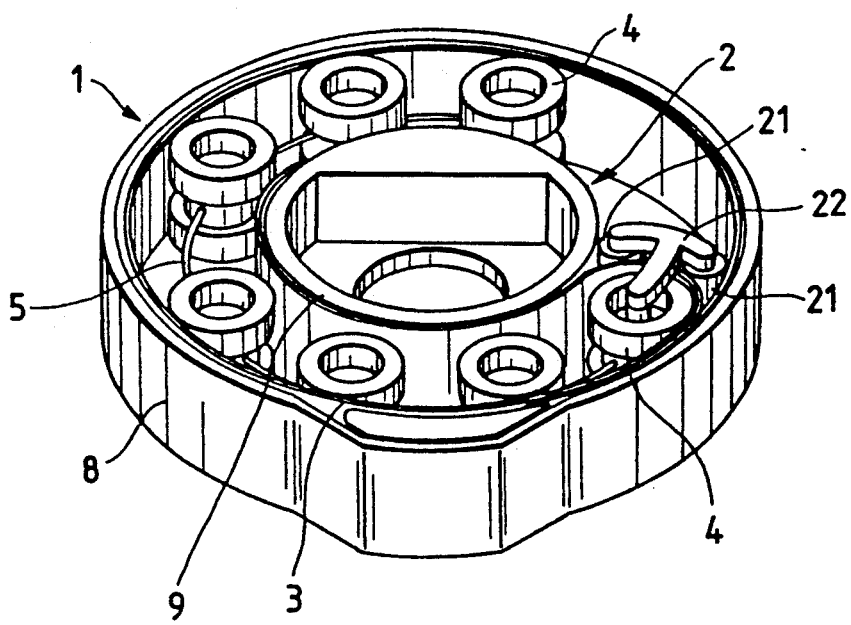
FIG. 12 is a perspective view of the clock spring connector, showing still another variant form thereof.

FIG. 12 is a perspective view showing an embodiment wherein the slide member involves the use of a plurality of small rollers 21 axially supported on an oscillating lever 22 assuming a T-shape in plan. In this case, the small rollers 21 may be disposed so that a locus when plotting the peripheral surfaces of the small rollers 21 forms a pseudo recessed peripheral surface. Hence, the U-like configuration of the turned-back portion 3a can be surely maintained by the respective small rollers 21 regardless of the fact that the roller 17 having an extremely small frictional resistance with the turned-back portion 3a is used.

Further, the third embodiment discussed above has dealt with the case where the turned-back portions 3a of the flexible cable 3 contact the peripheral surfaces of the connecting member at both ends thereof; and the connecting member 15, the rollers 16a, 16b held by the connecting member 15 and the springs 17 move in the peripheral direction while following up the motions of the turned-back portions 3a. As in the same manner with the embodiment shown in FIGS. 10-12, however, the slide member is connected to one end of the connecting member 15 looped with the turned-back portion 3a. When the upper case 2 is rotated in any one direction, the turned-back portion 3a may contact the slide member.

Figure 13:
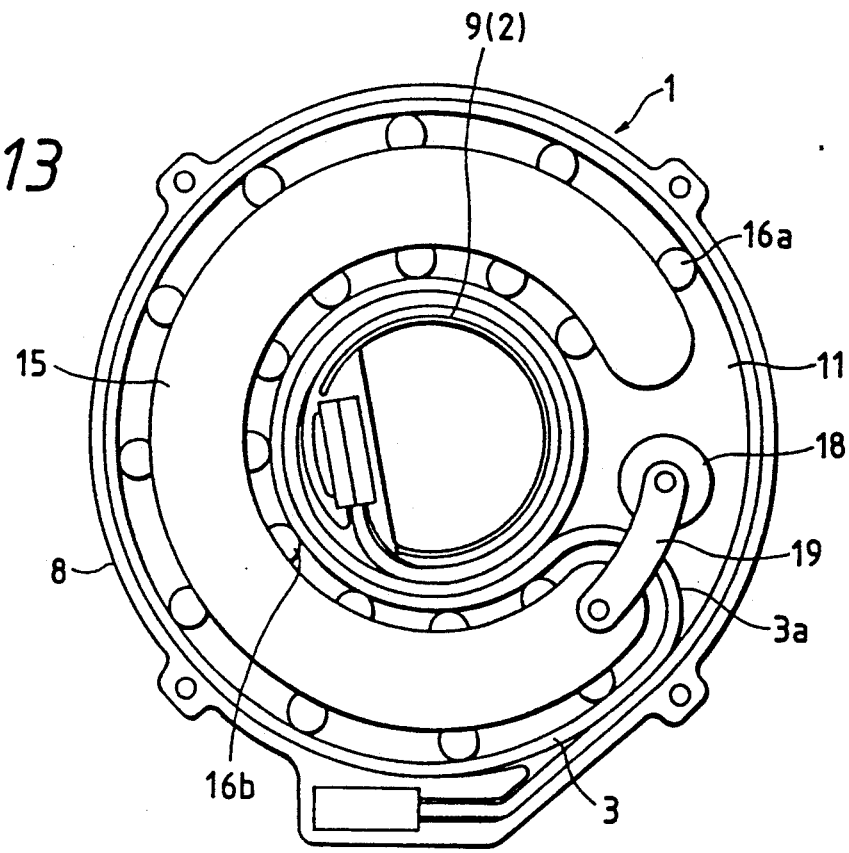
FIG. 13 is a plan view of the clock spring connector, showing a further variant form thereof.

Namely, FIG. 13 is a plan view showing an embodiment wherein the slide member involves the use of the contact roller 18 connected via the arm 19 to one end of the connecting member 15 looped with the turned-back portion 3a. Exhibited is the same effect with the embodiment of FIG. 10.

Figure 14:
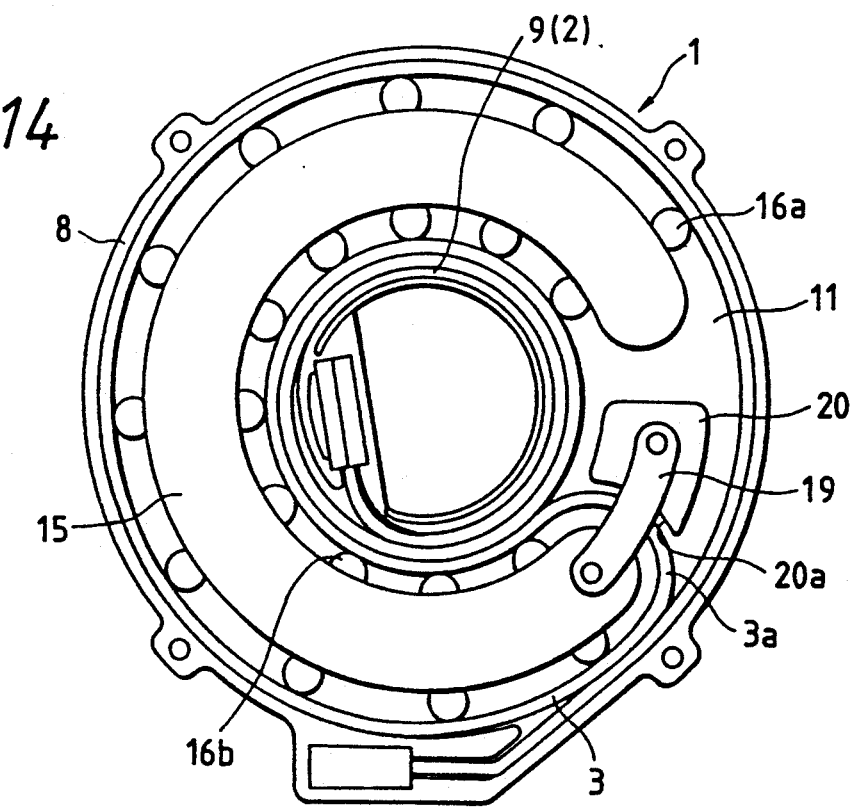
FIG. 14 is a plan view of the clock spring connector, showing a still further variant form thereof.

FIG. 14 is a plan view showing an embodiment wherein the slide member involves the use of the curved member 20 having 2 recessed peripheral surface 20a. Exhibited is the same effect with the embodiment of FIG. 11.

Figure 15:
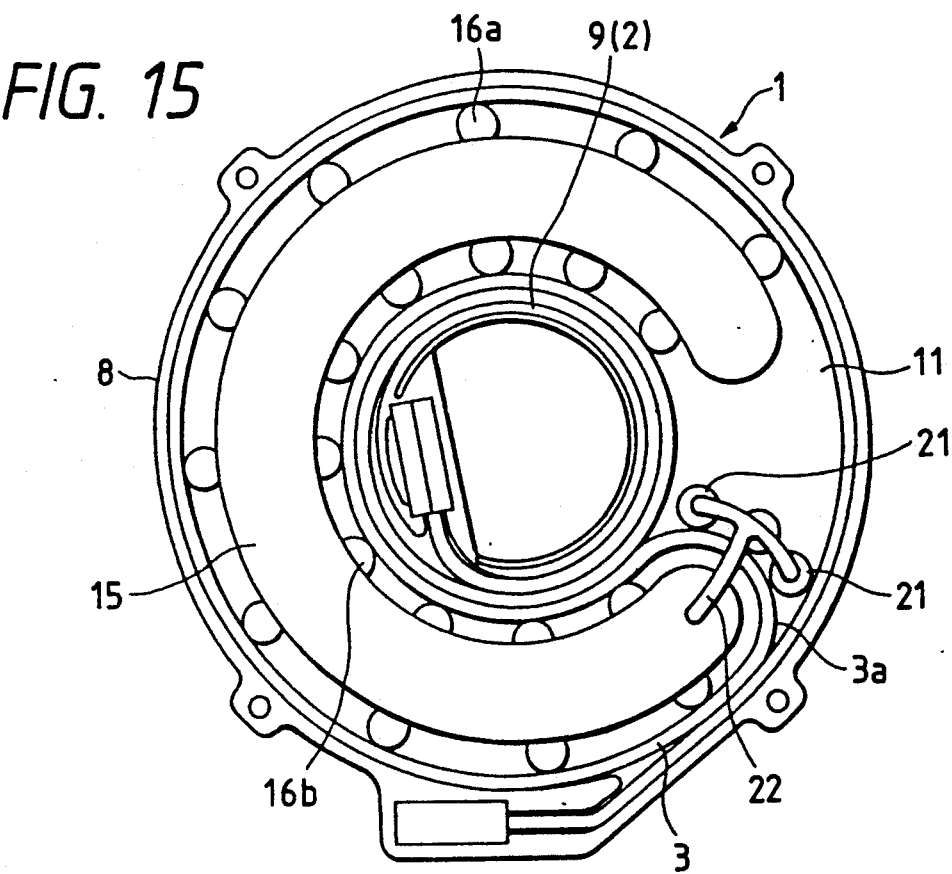
FIG. 15 is a plan view of the clock spring connector, showing a yet further variant form thereof.

FIG. 15 is a plan view showing an embodiment wherein the slide member involves the use of the plurality of small rollers 21 axially supported on the oscillating lever 22 assuming the T-shape in plan. Exhibited is the same effect with the embodiment of FIG. 12.

Figure 16:
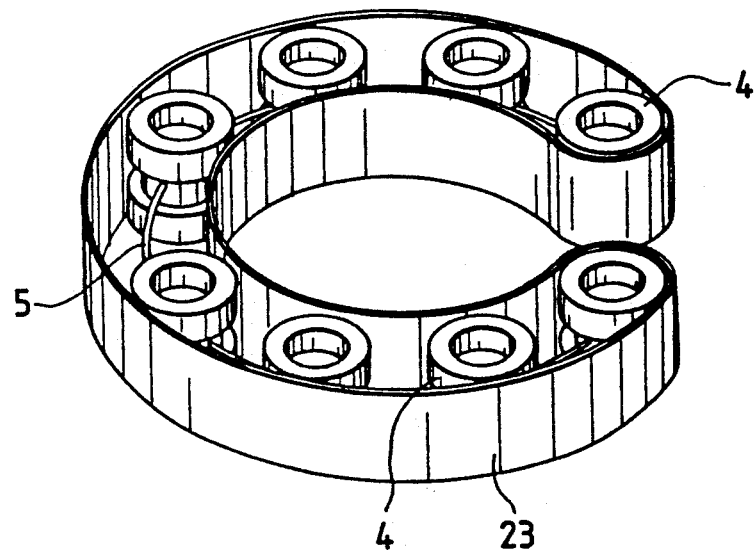
FIG. 16 is a perspective view of the principal part, showing an additional variant form thereof.
Figure 17:
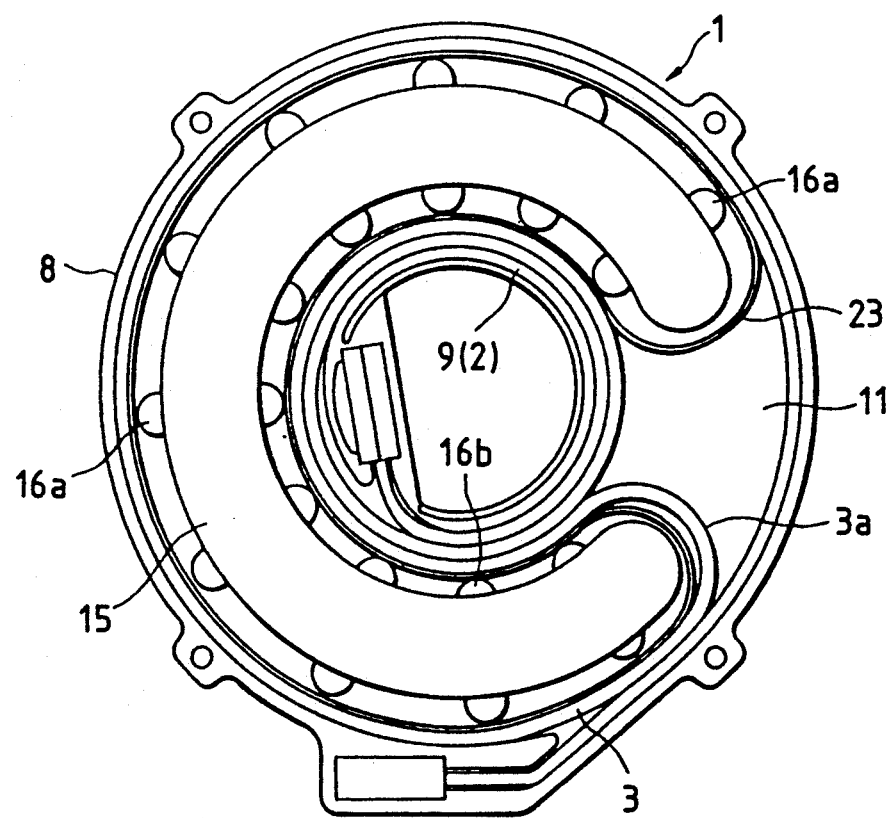
FIG. 17 is a plan view of the clock spring connector, showing a still additional variant form thereof.

The first and second embodiments have dealt with the case where the flexible cable 3 directly contacts the respective rollers 4. As illustrated in FIG. 16, however, an endless belt 23 may be wound on the respective rollers 4 and interposed between the flexible cable 3 and the individual rollers 4. Similarly, the third embodiment has dealt with the case where the flexible cable 3 directly contacts the respective rollers 16a, 16b. As depicted in FIG. 17, however, the endless belt 23 may be wound on the individual rollers 16a, 16b and interposed between the flexible cable 3 and the respective rollers 16a, 16b. In this case, it is possible to prevent the flexible cable 3 from intruding in between the two adjacent rollers owing to the endless belt 23 even when arrangement pitches between the rollers 4 and between the rollers 16a, 16b are set large. Thus, the number of the rollers required can be reduced.

Figure 18:
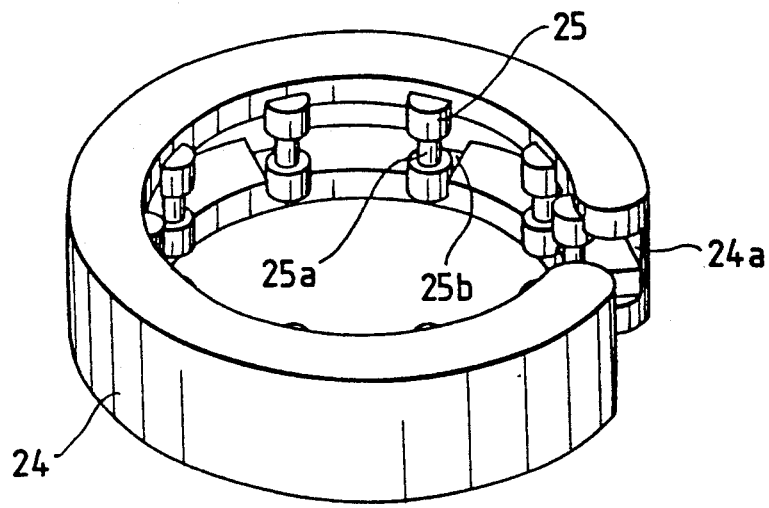
FIG. 18 is a perspective view of the principal part, showing a yet additional variant form thereof.
Figure 19:
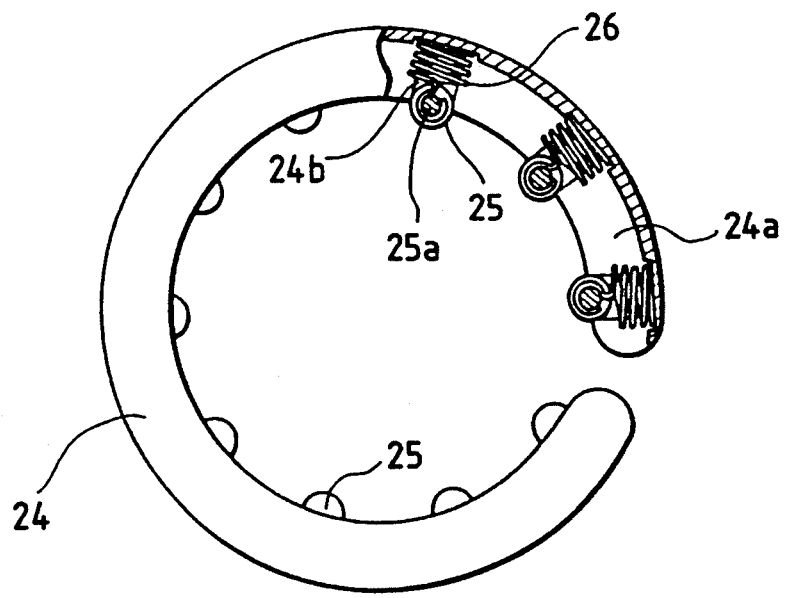
FIG. 19 is a plan view of the principal part, showing another variant form thereof.

FIGS. 18 and 19 show another variant form of the present invention. FIG. 18 is a perspective view of the principal part. FIG. 19 is a plan view, wherein some portions of FIG. 18 are broken away. A different point of this variant form from the first embodiment is that a plurality of rollers 25 are held on the inner peripheral surface of a connecting member 24 assuming a C-like configuration in plan through springs 26; and the individual rollers 25 are brought into press-contact with the peripheral surface of the flexible cable 3 wound on the inner cylindrical unit 9 by dint of elastic forces of the springs 26. Other constructions are the same. The connecting member 24 includes recessed grooves 24a formed in the inner peripheral surface thereof. The connecting member 24 also includes guide grooves 24b extending in the radial direction to traverse the recessed grooves 24a while keeping constant spacings from each other. The rollers 25 are so disposed in these guide grooves 24b as to be retractable. The individual rollers 25 are elastically biased inwards in the radial direction, i.e., in the central direction of the connecting member 24 by means of springs 26 having their one end secured to the connecting member 24 and their other end secured to small-diameter portions 25a of the rollers 25.

The thus constructed connecting member 24 is interposed between the flexible cable 3 wound on the outer cylindrical unit 8 and the flexible cable 3 wound on the inner cylindrical unit 9. The turned-back portion 3a loops around one end peripheral surface of the connecting member 24. Therefore, it follows that the flexible cable 3 wound on the inner cylindrical unit 9 is elastically biased towards the outer peripheral surface of the inner cylindrical unit 9 by the respective rollers 25. Exhibited is substantially the same effect with the first embodiment discussed above. Besides, in the case of this embodiment, the respective rollers 25 are capable of thrusting the flexible cable 3 independently without interfering with each other. It is therefore feasible to prevent the deformation and buckling of the flexible cable 3 wound on the inner cylindrical unit 9 more surely. Note that, if necessary, separate rollers are axially supported on one or both ends of the connecting member 24, and there can be made a contrivance to reduce the frictional resistance with the turned-back portion 3a with the aid of these rollers.

Figure 20:
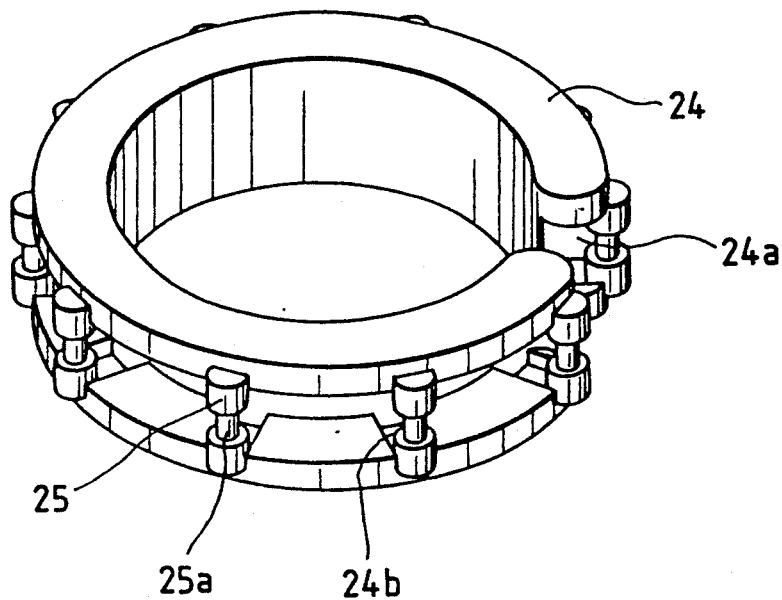
FIG. 20 is a perspective view of the principal part, showing other variant form thereof.
Figure 21:
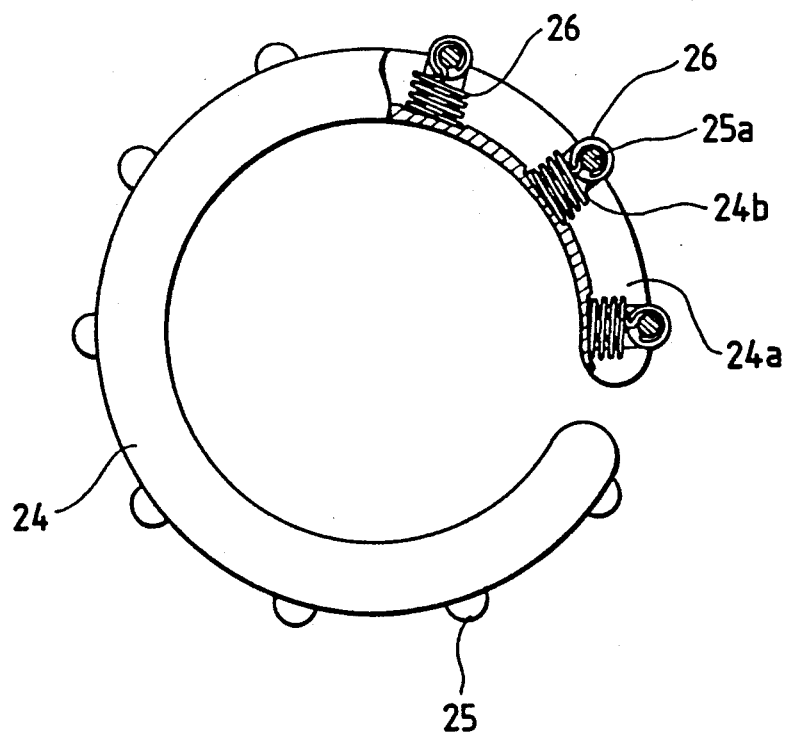
FIG. 21 is a plan view illustrating the principal part of FIG. 20 with some portions broken away.

FIGS. 20 and 21 are views in which the variant form of FIGS. 18 and 19 is applied to the second embodiment. FIG. 20 is a perspective view illustrating the principal part. FIG. 21 is a plan view in which some portions are broken away. A different point of this variant form from the embodiment of FIGS. 18 and 19 is that the plurality of rollers 25 are held on the outer peripheral surface of the connecting member 24 assuming the C-like configuration in plan through the springs 26. The respective rollers 25 are come into press-contact with the inner peripheral surface of the flexible cable 3 wound on the outer cylindrical unit 8 with the aid of the elastic forces of the springs 26. Other constructions are the same. Therefore, it follows that the flexible cable 3 wound on the outer cylindrical unit 8 is elastically biased towards the inner peripheral surface of the outer cylindrical unit 8 by the individual rollers 25. Exhibited is substantially the same effect with the second embodiment discussed above. In addition in the case of this embodiment, the respective rollers 25 are capable of thrusting the flexible cable 3 independently without interfering with each other. It is therefore feasible to surely prevent the deformation and buckling of the flexible cable 3 wound on the outer cylindrical unit 8 more surely. Note that, if necessary, separate rollers are axially supported on one or both ends of the connecting member 24, and there can be made a contrivance to reduce the frictional resistance with the turned-back portion 3a by these rollers.

Figure 22:
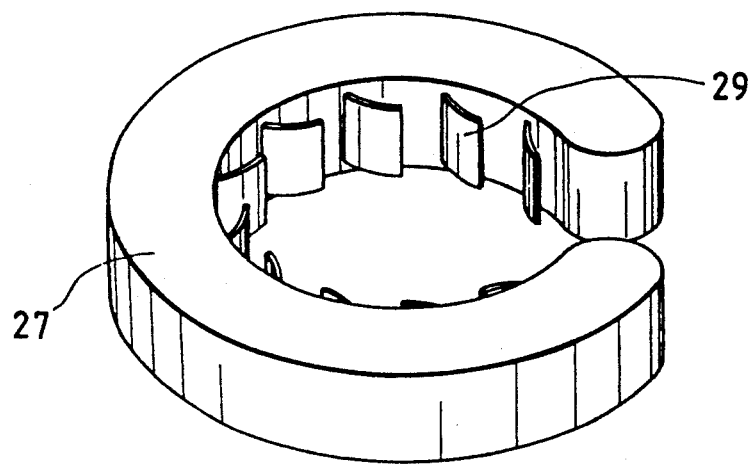
FIG. 22 is a perspective view of the principal part, showing other variant form thereof.
Figure 23:
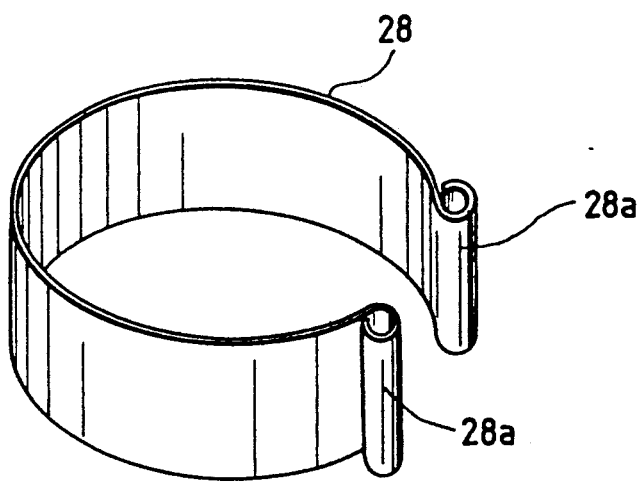
FIG. 23 is a perspective view of the principal part, showing other variant form thereof.
Figure 24:
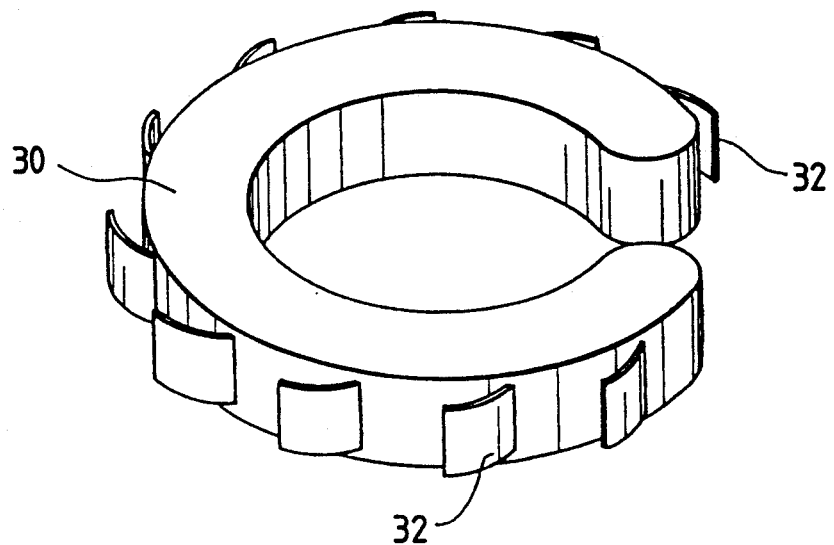
FIG. 24 is a perspective view of the principal part, showing other variant form thereof.

A connecting member 27 illustrated in FIG. 22 and a leaf spring 28 depicted in FIG. 23 are usable in place of the wire spring 5 and the rollers 4 in the first embodiment.

As illustrated in FIG. 22, one end of each of a plurality of elastic tongue pieces 29 each composed of a synthetic resin, an elastic plate and the like are fixed to the inner periphery of the connecting member 27, keeping constant spacings from each other. The other ends of these tongue pieces 29 elastically contact the flexible cable 3 wound on the inner cylindrical unit 9. Therefore, it follows that the flexible cable 3 wound on the inner cylindrical unit 9 is thrust independently towards the outer peripheral surface of the inner cylindrical unit 9 by dint of elastic forces of the respective elastic tongue pieces 29 themselves. Exhibited is the same effect with the embodiment shown in FIGS. 18 and 19. In addition in the case of this embodiment, the connecting member 30 and the individual tongue pieces 32 can be treated as one united body, thereby creating an effect of improving an assembling workability.

Figure 25:
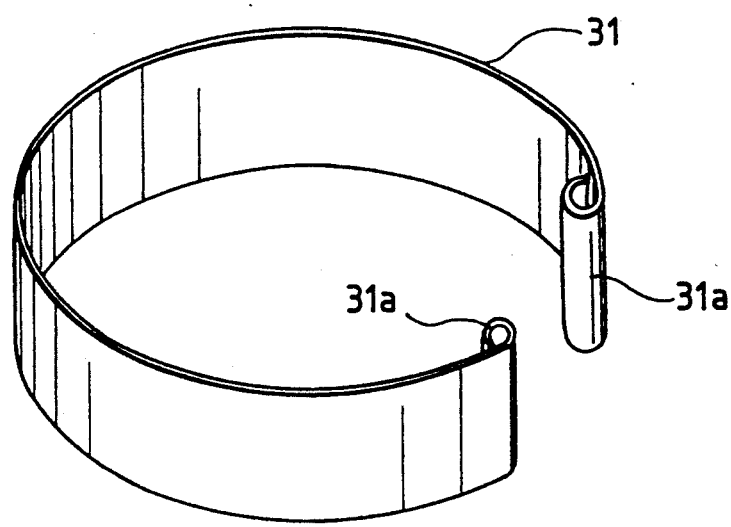
FIG. 25 is a perspective view of the principal part, showing other variant form thereof.

As illustrated in FIG. 25, the leaf spring 31 formed in the C-shape in plan is made of a metal plate or a synthetic resin material exhibiting a high elasticity. The leaf spring 31 is formed so that the elastic biasing force acts outwards. At the same time, the leaf spring 31 includes curl portions 31a formed at both ends thereof. This leaf spring 31 is disposed with the air space 11 and thrusts the flexible cable 3 wound on the outer cylindrical unit 8 upon the inner peripheral surface of the outer cylindrical unit 8. One curl portion 31a is looped with the turned-back portion 3a. Hence, in the case of this embodiment, it follows that the flexible cable 3 wound on the outer cylindrical unit 8 is thrust towards the inner peripheral surface of the outer cylindrical unit 8 by the leaf spring 31. Although the frictional resistance between the flexible cable 3 and the leaf spring 31 somewhat increases, almost the same effect with the second embodiment discussed above can be expected. In addition in the case of this embodiment, the leaf spring 31 having the simple configuration serves to prevent the buckling of the flexible cable 3 on the side of the outer cylindrical unit 8, thereby reducing the costs.

Figure 26:
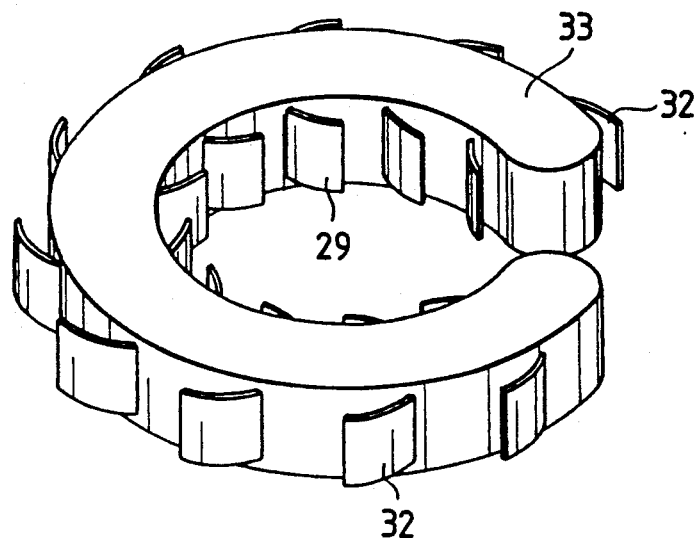
FIG. 26 is a perspective view of the principal part, showing other variant form thereof.
Figure 27:
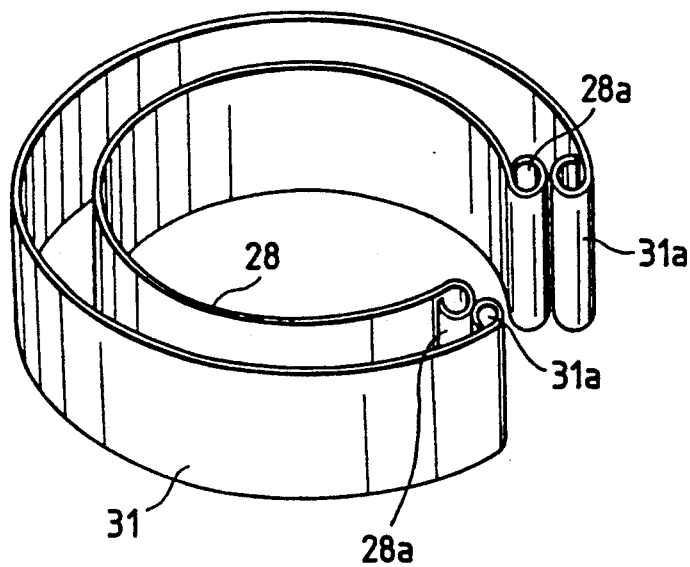
FIG. 27 is a perspective view of the principal part, showing other variant form thereof.

Moreover, in place of the connecting member 15 and the rollers 16 in the third embodiment, there can be used in combination a connecting member 33 including, as illustrated in FIG. 26, the elastic tongue pieces 29, 32 on the inner and outer peripheral surfaces and, as illustrated in FIG. 27, the leaf spring 31 of FIG. 25 as well as the leaf spring of FIG. 23.

Figure 28:
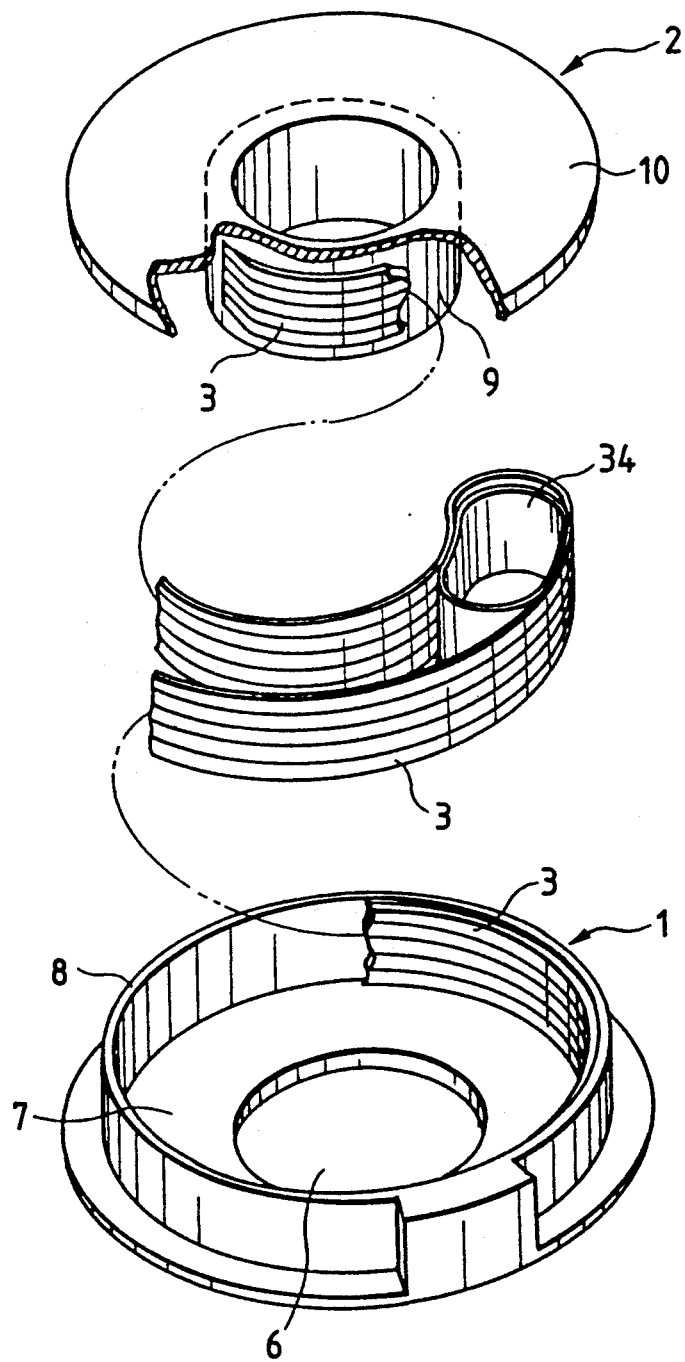
FIG. 28 is a perspective view illustrating the clock spring connector in a fourth embodiment of the present invention, wherein an upper case is partly omitted.
Figure 29:
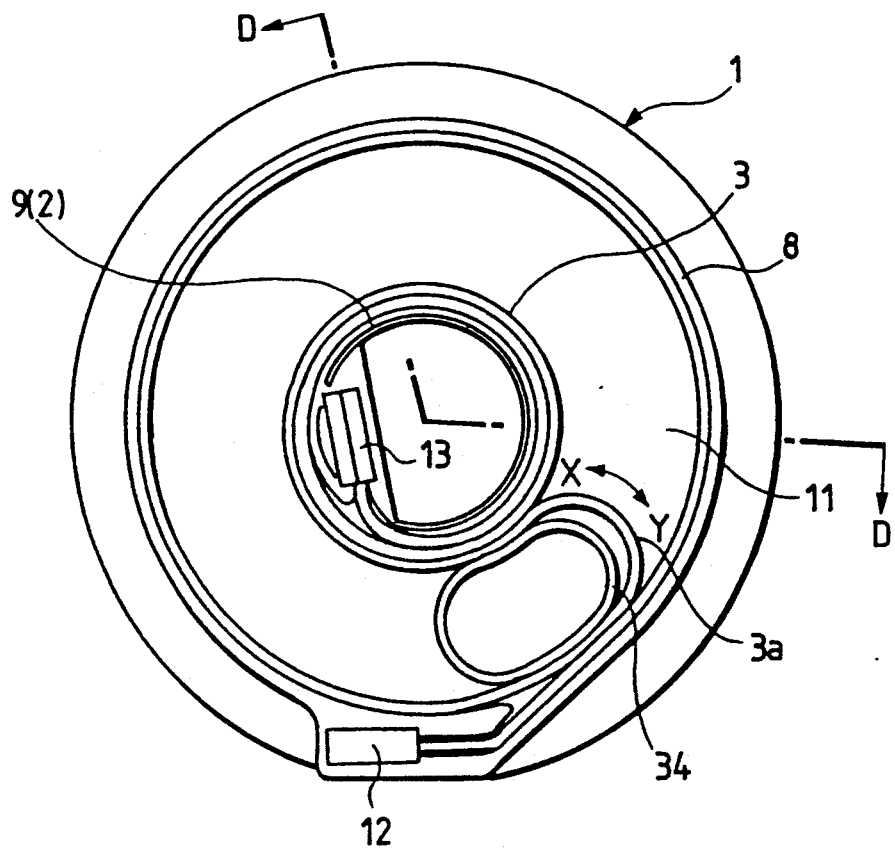
FIG. 29 is a plan view illustrating the clock spring connector of FIG. 28, wherein the upper case is partly omitted.
Figure 30:
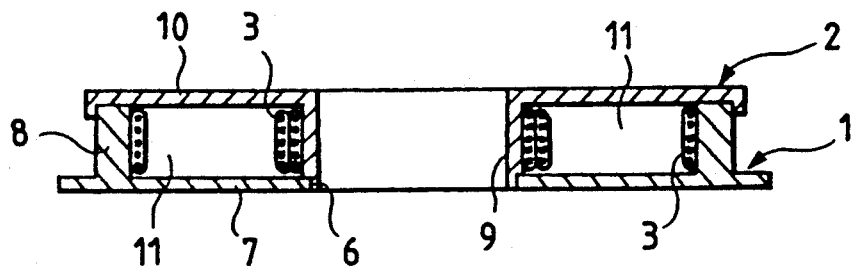
FIG. 30 is a sectional view taken substantially along the line D—D of FIG. 29.

FIGS. 28-30 are views of assistance in explaining the clock spring connector in a fourth embodiment of the present invention. FIG. 28 is an exploded perspective view illustrating the clock spring connector with some portions broken away. FIG. 29 is a plan view illustrating the clock spring connector, wherein an upper case is partly omitted. FIG. 30 is a sectional view taken substantially along the line D—D of FIG. 29.

A different point of the clock spring connector of this embodiment from the first embodiment is that an elastic ring 34 is so disposed inwardly of the turned-back portion 3a of the flexible cable 3 as to crush it instead of using the rollers 4 and the wire spring 5. Constructions other than this arrangement are fundamentally the same. Therefore, the vicinities of two ends of the turned-back portion 3a are so pressed as to contact the flexible cable 3 wound on the outer cylindrical unit 8 and the flexible cable 3 wound on the inner cylindrical unit 9 by such an outward resilient force of the elastic ring 34 as to revert to its original configuration.

In the thus constructed fourth embodiment, to start with, when the upper case 2 is rotated clockwise from the state shown in FIG. 29, the turned-back portion 3a of the flexible cable 3 moves clockwise by a rotational quantity smaller than the upper case 2, and the flexible cable 3 having a length equivalent to the above-mentioned moving quantity is led out of the outer cylindrical unit 8 and tightly wound on the inner cylindrical member 9. In this case, the vicinities of two ends of the flexible cable 3 are respectively brought into press-contact with the flexible cable 3 wound on the outer cylindrical unit 8 and the flexible cable 3 wound on the inner cylindrical unit 9 on undergoing the resilient force from the elastic ring 34. Consequently, the turned-back portion 3a is moved clockwise within the air space 11 while being fed out in an arrowed direction X in FIG. 29 by the frictional force caused on these press-contact surfaces. The flexible cable 3 on the side of the outer cylindrical unit 8 is smoothly and tightly wound on the inner cylindrical unit 9 through the turned-back portion 3a. Further, the elastic ring 34 is moved clockwise within the air space 11 while rotating in the arrowed direction X and following up the turned-back portion 3a by the frictional forces caused with respect to the vicinities of two ends of the turned-back portion 3a.

In reverse to the above-mentioned, when the upper case 2 is rotated counterclockwise from the position illustrated in FIG. 29, the turned-back portion 3a of the flexible cable 3 moves counterclockwise by a rotational quantity smaller than the upper case 2. The flexible cable 3 having a length equivalent to the moving quantity is led out of the inner cylindrical unit 9 and rewound on the outer cylindrical unit 8. In this case, the turned-back portion 3a moves counterclockwise within the air space 11 while being fed out in an arrowed direction Y in FIG. 29. The flexible cable 3 on the side of the inner cylindrical unit 9 is smoothly rewound on the outer cylindrical unit 8 through the turned-back portion 3a. The elastic ring 34 moves counterclockwise within the air space 11 while rotating in the arrowed direction Y and following up the turned-back portion 3a.

In the clock spring connector in accordance with the this fourth embodiment, as in the same way with the first embodiment discussed above, the flexible cable 3 is wound reversely on the outer and inner cylindrical units 8, 9 through the turned-back portion 3a. It is therefore possible to reduce the length of the flexible cable 3 required, as a result of which the total costs can be reduced. At the same time, this gives an advantage for miniaturization. Further, the vicinities of the turned-back portion 3a of the flexible cable 3 are brought into press-contact with the flexible cable 3 wound on the outer cylindrical unit 8 and the flexible cable 3 wound on the inner cylindrical unit 9 by the resilient force of the elastic ring 34. The turned-back portion 3a is smoothly rotatably movable by the frictional force between these press-contact surfaces. It is possible to surely perform the tight-wind and rewind operation. Further, the elastic ring 34 rotates and revolves by dint of the frictional forces produced with respect to the vicinities of two ends of the turned-back portion 3a due to the resilient force of the ring itself. This eliminates the necessity for a complicated driving mechanism, which in turn brings about a reduction in cost and miniaturization of the clock spring connector.

Besides, in the clock spring connector in the fourth embodiment also, many variant forms shown in FIGS. 31-36 are attainable.

Figure 31:
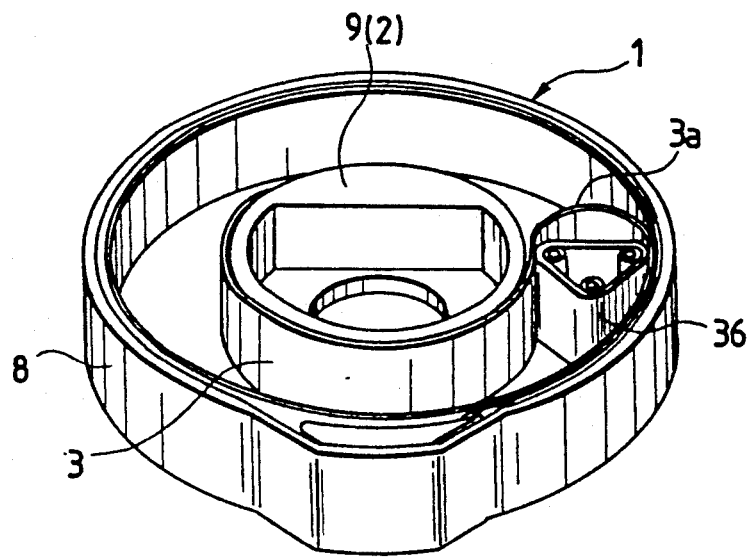
FIG. 31 is a perspective view of the clock spring connector, showing a variant form thereof.
Figure 32:
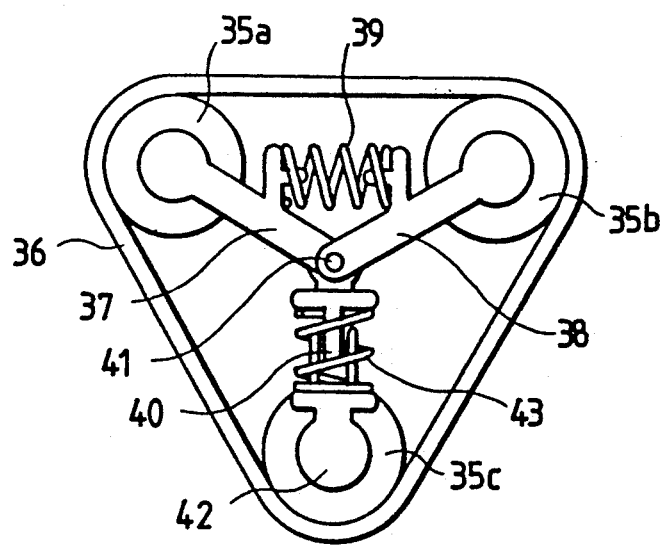
FIG. 32 is an enlarged plan view illustrating an elastic member provided in the clock spring connector of FIG. 31.

FIG. 31 is a perspective view illustrating the clock spring connector, wherein an upper case is partly omitted. FIG. 32 is an enlarged plan view illustrating an elastic member provided in the clock spring connector. As depicted in these Figures, in accordance with this variant form, the elastic member disposed inwardly of the turned-back portion 3a of the flexible cable 3 involves the use of three rollers 35a, 35b, 35c elastically biased outwards and an endless belt 36 wound on the outer peripheries of the rollers 35a, 35b, 35c. The above-described rollers 35a, 35b are axially supported on one end of the first and second links 37, 38 respectively. These links 37, 38 are elastically biased in an expanding direction by a first spring 39 stretched between the links 37, 38. In addition, the other ends of the first and second links 37, 38 are connected to a third link 40 at equal intervals through approximately 120 degrees. The above-mentioned roller 35c is biased outwards by a second spring 43 stretched between a support member 42 for axially supporting the roller 35c and the third link 40.

Therefore, in the case of this variant form, the outer periphery of the endless belt 36 elastically contacts the vicinities of two ends of the turned-back portion 3a, whereby the belt rotates and revolves following up the rotary motion of the turned-back portion 3a. The same effect with the fourth embodiment described above can be expected. Imparted also to the endless belt 36 are the outward elastic biasing forces from the respective rollers 35a, 35b, 35c. It is therefore possible to surely prevent a slip between the flexible cable 3 and the endless belt 36.

Figure 33:
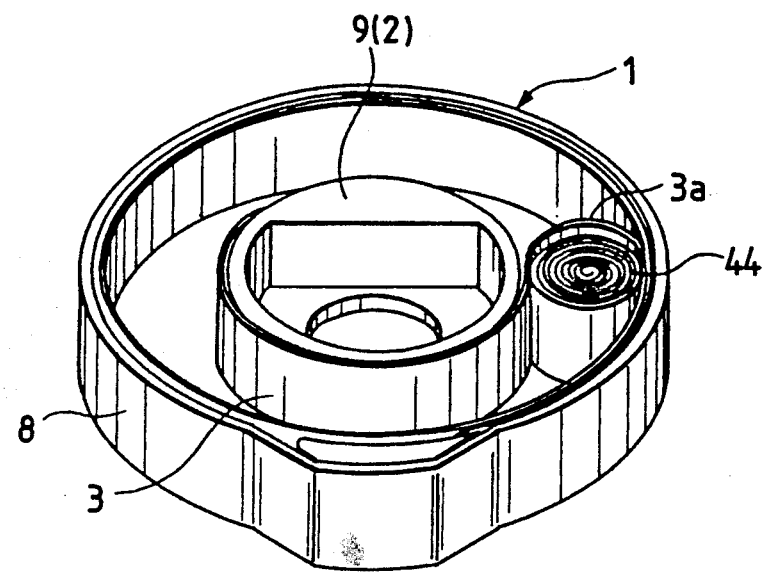
FIG. 33 is a perspective view of the clock spring connector, showing another variant form thereof.

Additionally, as a variant form of the elastic member in the fourth embodiment, a spiral spring 44 illustrated in FIG. 33 is also usable.

Figure 34:
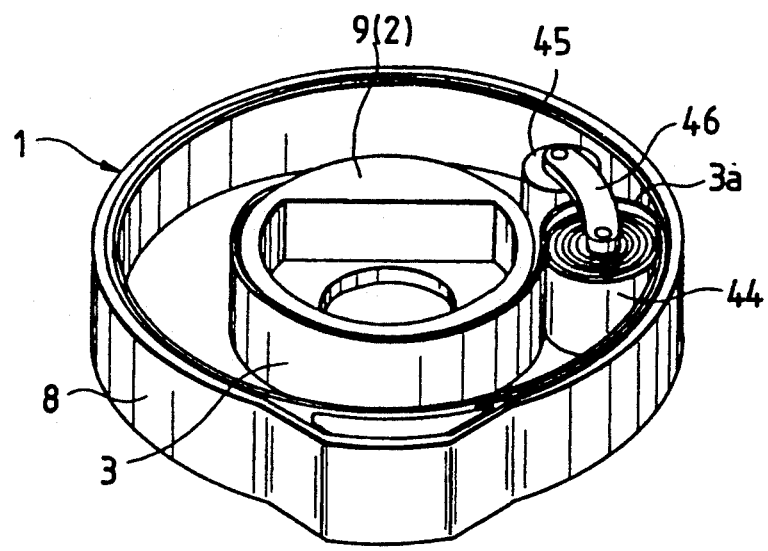
FIG. 34 is a perspective view of the clock spring connector, showing another variant form thereof.
Figure 35:
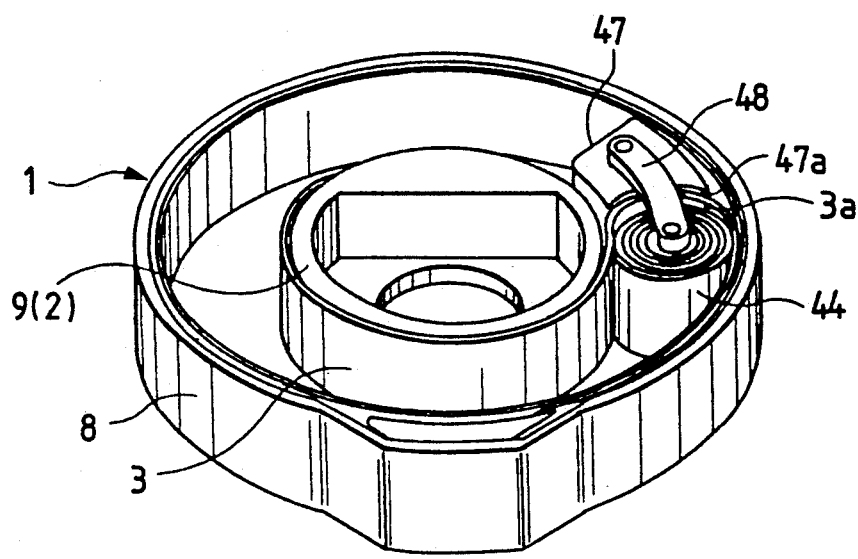
FIG. 35 is a perspective view of the clock spring connector, showing another variant form thereof.
Figure 36:
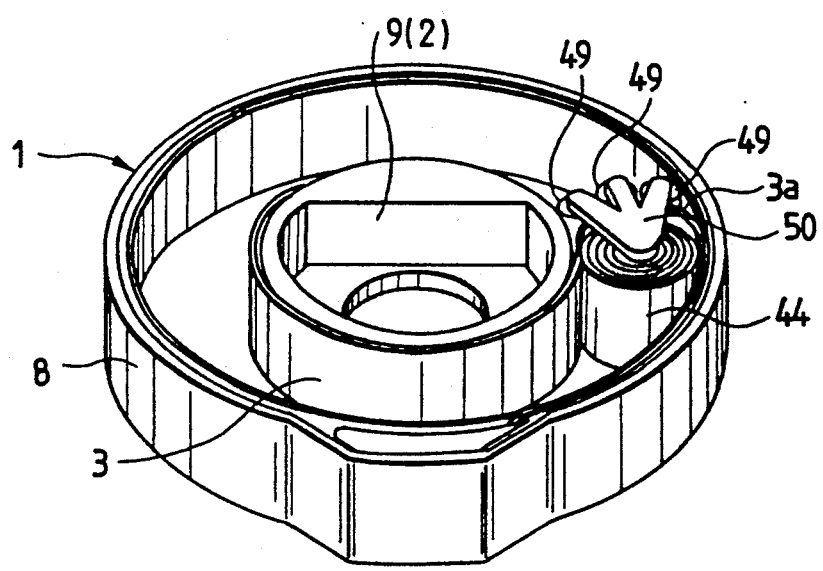
FIG. 36 is a perspective view of the clock spring connector, showing another variant form thereof.

Further, the fourth embodiment has dealt with the case where the elastic member is made to follow up the rotary movement of the turned-back portion 3a only by the elastic force of this member itself. As depicted in FIGS. 34-36, however, an interlocking member is connected via the turned-back portion 3a to the elastic member, and the turned-back portion 3a may contact the interlocking member during the rotation of the upper case 2 in any one direction.

In a variant form shown in FIG. 34, the interlocking member involves the use of a contact roller 45. The contact roller 45 is connected via an arm 46 to the center of a spiral spring 44 disposed inwardly of the turned-back portion 3a. In this case, even if slipping takes place between the flexible cable 3 and the spiral spring 44, because of the spiral spring 44 connected through the turned-back portion 3a to the opposite contact roller 45, thus surely preventing a separation of the spiral spring 44 from the turned-back portion 3a. In addition, the turned-back portion 3a contacts the peripheral surface of the spiral spring 44 or the contact roller 45 with a small frictional resistance depending on the rotating directions of the upper case 2. Hence, the turned-back portion 3a smoothly moves in the peripheral direction. Besides, the contact roller 45 is capable of oscillating in the radial direction of the air space 11 with the aid of an arm 46. The contact roller 45 is biased in oscillation to the inner cylindrical unit 9 when the flexible cable 3 is densely wound on the outer cylindrical unit 8 but to the outer cylindrical unit 8 when the flexible cable 3 is densely wound on the inner cylindrical unit 9. The turned-back portion 3a can be thus surely guided.

In a variant form shown in FIG. 35a, the interlocking member involves the use of a curved member 47 having a recessed peripheral surface 47a. The curved member 47 is connected to the spiral spring 44 through the turned-back portion 3a so that the peripheral surface 47a thereof confronts the spiral spring 44. In this case, although a frictional resistance between the turned-back portion 3a and the curved member 47 is somewhat greater than in the contact roller 45 illustrated in FIG. 34, a deformation of the turned-back portion can be surely prevented, because the U-like configuration of the turned-back portion 3a is maintained by the peripheral surface 47a.

In a variant form depicted in FIG. 36, the interlocking member involves the use of a plurality of small rollers 49. These small rollers 49 are axially supported on one end of an oscillation lever 50. The other end of the oscillation lever 50 is axially supported on the center of the spiral spring 44. In this case, the small rollers 49 can be disposed so that a locus when plotting the peripheral surfaces of the small rollers 49 forms a pseudo recessed peripheral surface. Hence, the U-like configuration of the turned-back portion 3a can be surely maintained by the respective small rollers 49 irrespective of the fact that the small rollers 49 having extremely small frictional resistances with the turned-back portion 3a. Note that in the variant forms shown in FIGS. 34-36, the spiral spring 44 is exemplified as one example of the elastic member to which the interlocking member is connected. However, elastic members other than the spiral spring, which are illustrated in, e.g., FIGS. 31 and 32, are also usable.

Figure 37:
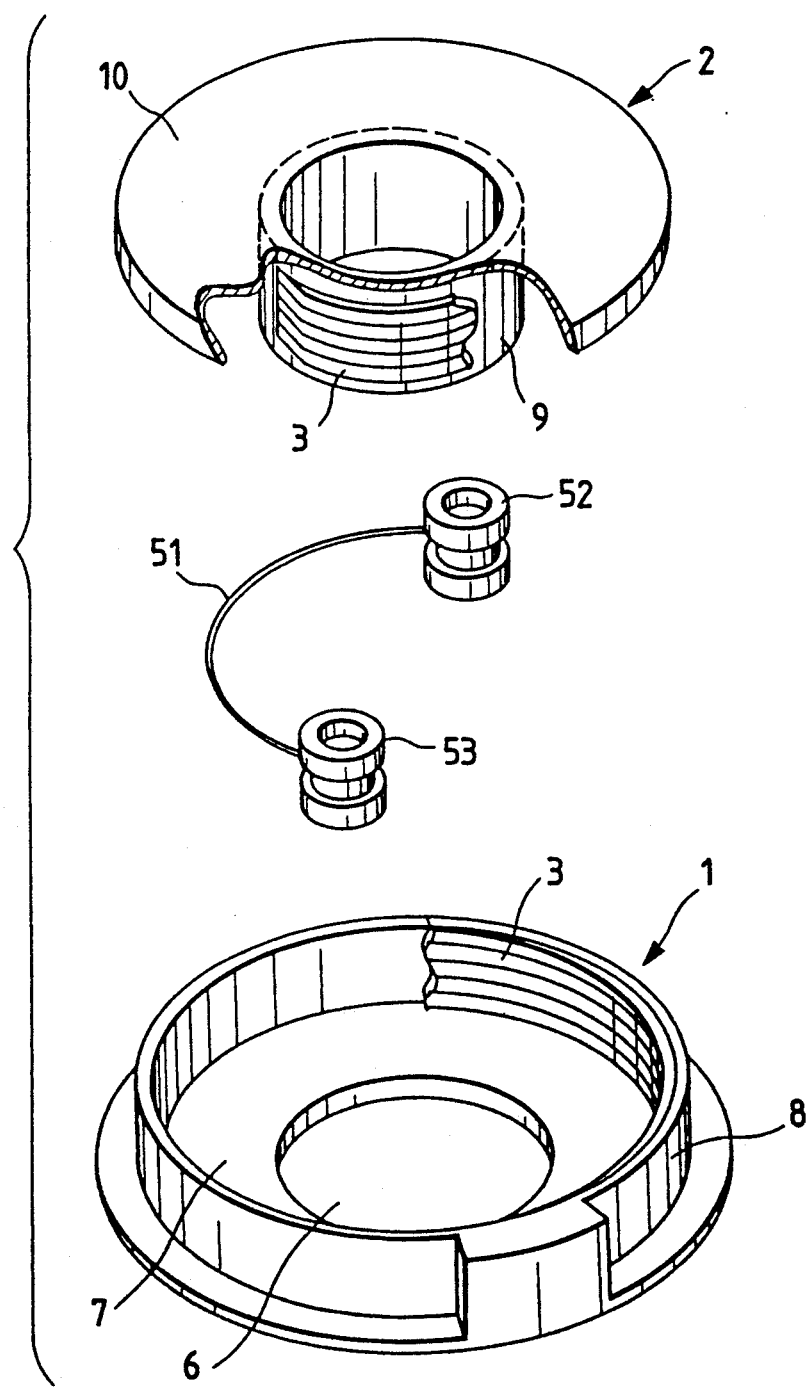
FIG. 37 is an exploded perspective view depicting the clock spring connector with some portions broken away in a fifth embodiment of the present invention.
Figure 38:
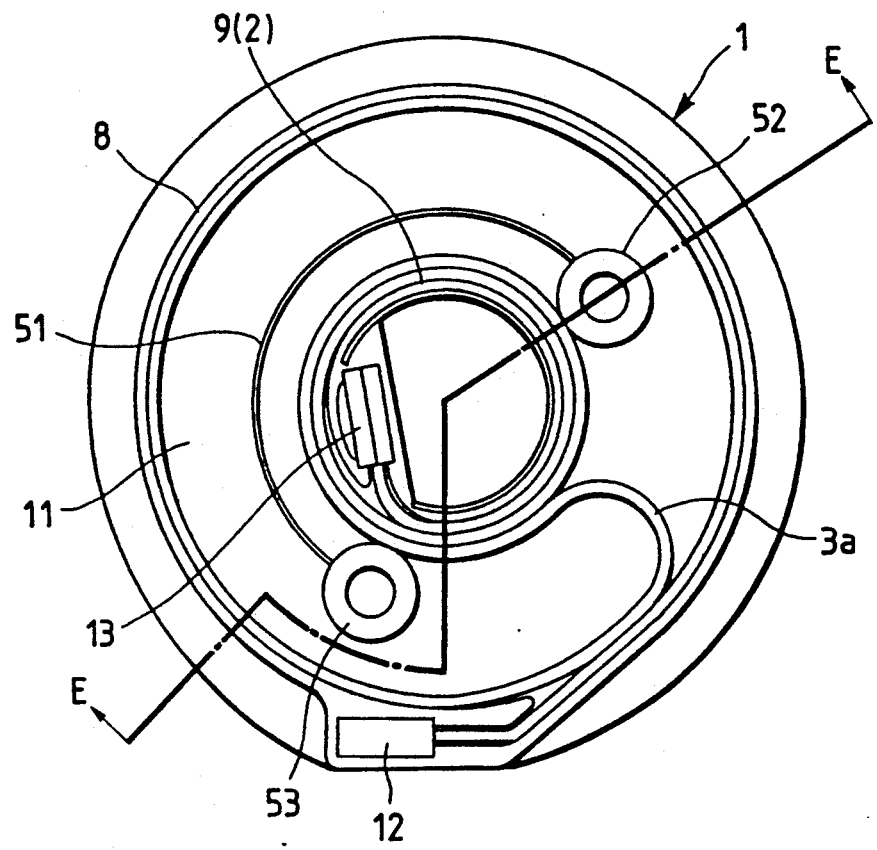
FIG. 38 is a plan view illustrating the clock spring connector of FIG. 37, wherein the upper case is partly omitted.
Figure 39:
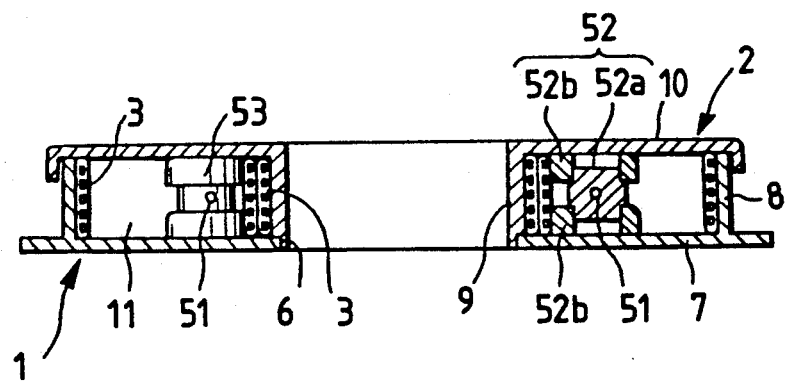
FIG. 39 is a sectional view taken substantially along the line E—E of FIG. 38.
Figure 40:
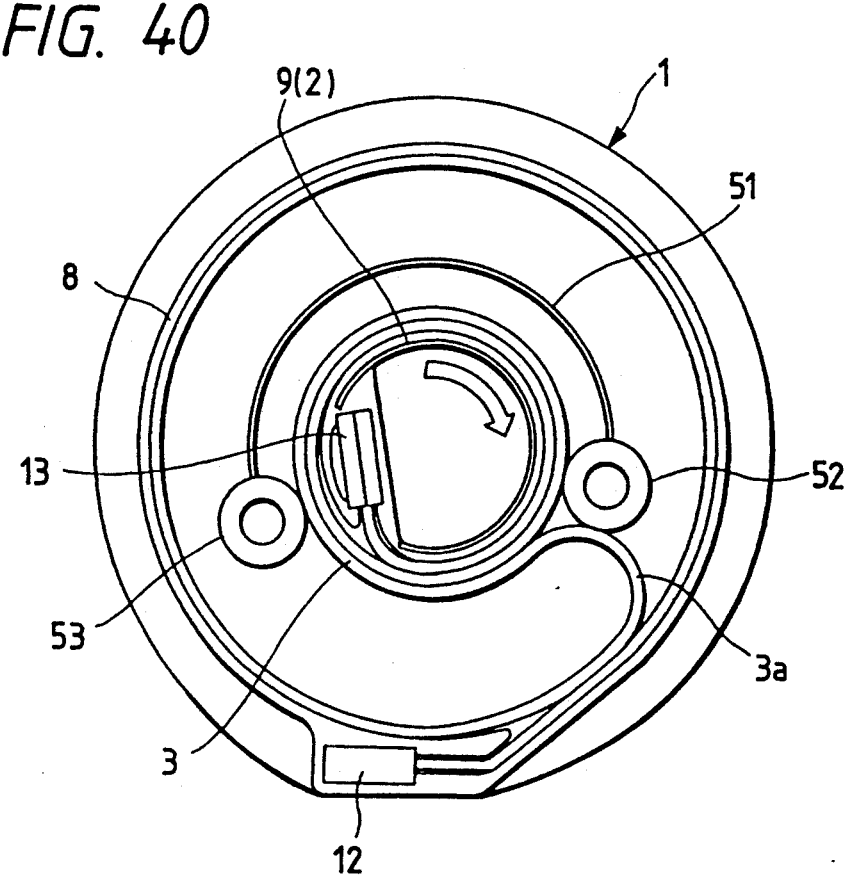
FIG. 40 is a view of assistance in explaining the operation of the clock spring connector shown in FIG. 37.
Figure 41:
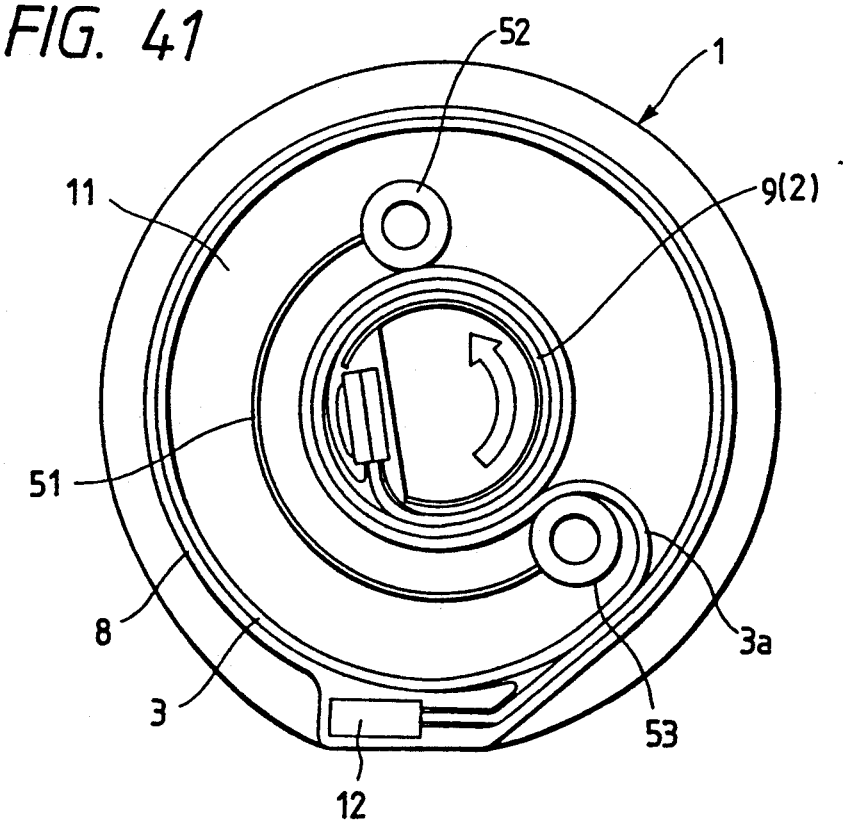
FIG. 41 is a view of assistance in explaining the operation of the clock spring connector shown in FIG. 37.

FIGS. 37-41 are views of assistance in explaining the clock spring connector in a fifth embodiment of the present invention. FIG. 37 is an exploded perspective view depicting the clock spring connector with some portions broken away. FIG. 38 is a plan view depicting the clock spring connector, wherein an upper case is partly omitted. FIG. 39 is a sectional view taken substantially along the line E—E of FIG. 38. FIGS. 40 and 41 are explanatory views showing the operation of the clock spring connector.

A different point of the clock spring connector in the fifth embodiment from the first embodiment is that first and second rollers 52, 53 connected to a wire spring 51 are employed in place of the multiplicity of rollers 4 connected to the wire spring 5. Constructions other than this arrangement are basically the same. As obvious from FIG. 39, the first roller 52 is constructed of a circular cylindrical part 52a and rotary parts 52b rotatably supported on the vertical two ends thereof. The wire spring 51 formed in a C-shape is fixed to this circular cylindrical part 52a. The first roller 52 is thus rotatably secured to one end of the wire spring 51. Further, the second roller is constructed in the same manner with the first roller 52 and is therefore rotatably secured to the other end of the wire spring 51. These first and second rollers 51, 52 undergo elastic biasing forces to diminish inwardly of the wire spring 51 and are biased to come into press-contact with the outer peripheral surface of the inner cylindrical unit 9 of the upper case 2.

FIG. 38 illustrates a neutral state where the upper case 2 is rotatable clockwise and counterclockwise substantially by the same quantity. When rotating the upper case 2 clockwise from this neutral state, the turned-back portion 3a of the flexible cable 3 moves clockwise by a less rotary quantity than the upper case. The flexible cable 3 having a length equivalent to the moving quantity is fed out of the outer cylindrical unit 8 and tightly wound on the inner cylindrical unit 9. In this case, the first and second rollers 52, 53 undergo the resilient force given from the wire spring 51 and respectively press-contact the flexible cable 3 wound on the inner cylindrical unit 9. Therefore, the two rollers 52, 53 move clockwise at the same velocity as that of the inner cylindrical unit 9 by the frictional forces caused between the press-contact surfaces. As illustrated in FIG. 40, the first roller 52 approaches the outside of the turned-back portion 3a, whereas the second roller 53 moves away from the turned-back portion 3a. Hence, when the upper case 2 is further rotated clockwise, the first roller 52 revolves clockwise while rotating counterclockwise about the inner cylindrical unit 9, thus pressing the outer surface of the turned-back portion 3a. Note that the motions of the second roller 52 rotating to follow up the inner cylindrical unit 9 are transmitted via the wire spring 51 to the first roller 52, thus keeping such revolutions of the first roller 52. A large proportion of the flexible cable 3 is tightly wound on the inner cylindrical unit 9 in the clockwise rotary end position of the upper case 2.

In reverse to the above-mentioned, when rotating the upper case from the position shown in FIG. 38, the turned-back portion 3a of the flexible cable 3 moves counterclockwise by a less rotary quantity than the upper case 2. The flexible cable 3 having a length equivalent to the moving quantity is fed out of the inner cylindrical unit 9 and rewound on the outer cylindrical unit 8. In this case, the two rollers 52, 53 move counterclockwise at the same velocity as that of the inner cylindrical unit 9. As depicted in FIG. 41, the first roller 52 moves away from the outside of the turned-back portion 3a, whereas the second roller 53 approaches the inside of the turned-back portion 3a. Therefore, when the upper case 2 is further rotated counterclockwise, the second roller 53 revolves counterclockwise while rotating clockwise about the inner cylindrical unit 9, thus pressing the inner surface of the turned-back portion 3a. Note that the motions of the first roller 52 rotating following up the inner cylindrical unit 9 are transmitted via the wire spring 51 to the second roller 53, thus keeping such revolutions of second roller 53. A large proportion of the flexible cable is rewound on the outer cylindrical unit 8 in the counterclockwise rotary end position of the upper case 2.

In the clock spring connector in accordance with the fifth embodiment also, as in the same way with the first embodiment, the flexible cable 3 is wound reversely on the outer and inner cylindrical units 8, 9 through the turned-back portion 3a. It is therefore possible to reduce the length of the flexible cable required, as a result of which the total costs can be reduced. At the same time, this gives an advantage for miniaturization. In addition, the first roller 52 or the second roller 53 revolves following up the movement of the turned-back portion 3a of the flexible cable 3. The turned-back portion 3a can be therefore smoothly rotationally moved. It is feasible to surely effect the tight-wind or rewind operation. Further, the forces by which the first and second rollers 52, 53 revolve are generated by transmitting the rotary force of the inner cylindrical unit 9 to the two rollers 52, 53 via the flexible cable 3 wound thereon. The two rollers 52, 53 can be therefore made to revolve without using a complicated driving mechanism. The clock spring connector can be reduced in terms of costs and size. Besides, the second roller 53 is rotatably secured to one end of the wire spring 51, and therefore, when rotating the upper case 2 counterclockwise in FIG. 38, it follows that the second roller 53 contacts the inner surface of the turned-back portion 3a while rotating clockwise. Namely, the force for feeding out the turned-back portion 3a towards the outer cylindrical unit 8 acts between the turned-back portion 3a and the second roller 53 contiguous thereto. The flexible cable 3 can be smoothly fed out towards the outer cylindrical unit 8 through the turned-back portion 3a.

Further, in the clock spring connector in the fifth embodiment, a variety of variant forms shown in FIGS. 42-52 are attainable.

Figure 42:
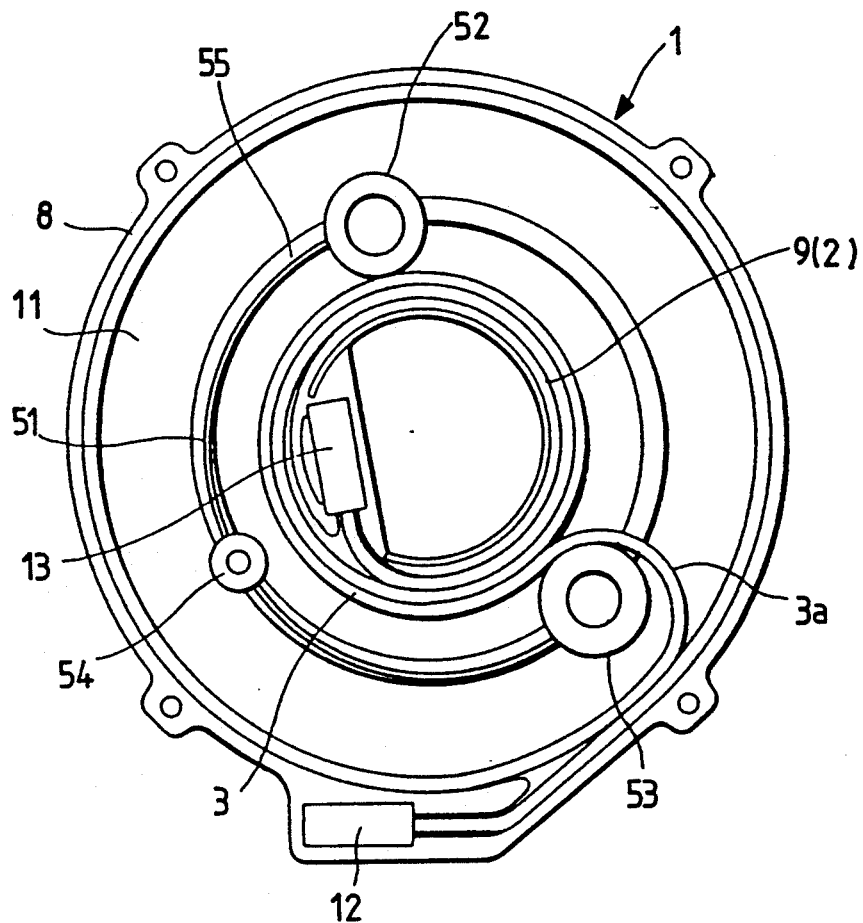
FIG. 42 is a plan view of the clock spring connector, showing another variant form thereof.
Figure 43:
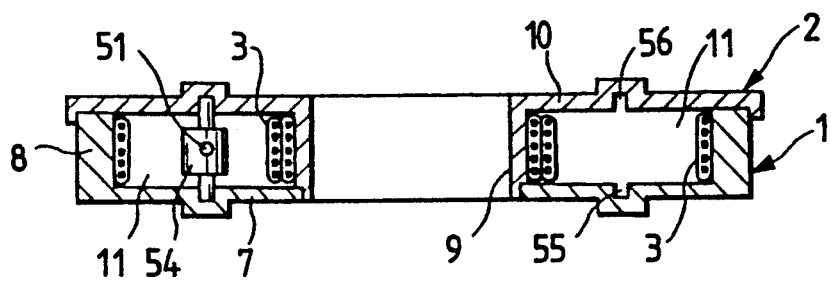
FIG. 43 is a vertical sectional view of the clocks spring connector shown in FIG. 42.
Figure 44:
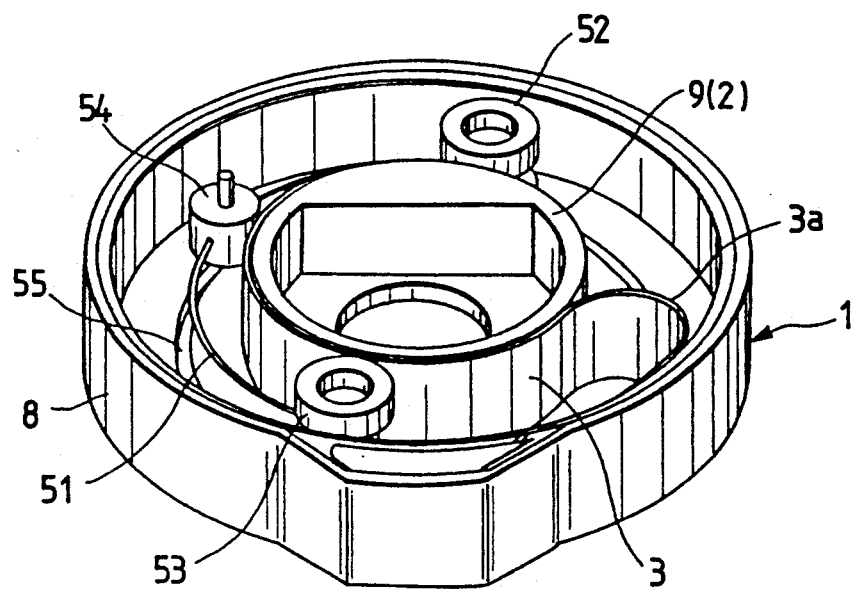
FIG. 44 is a perspective view of the clock spring connector shown in FIG. 42.
Figure 45:
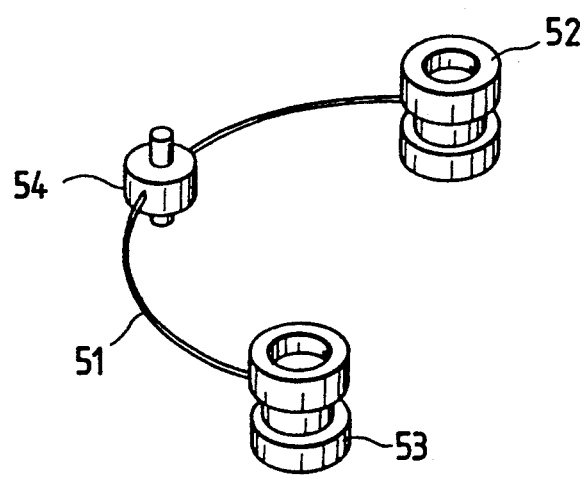
FIG. 45 is a perspective view illustrating a guide member provided in the clock spring connector shown in FIG. 42.

FIG. 42 is a plan view illustrating the clock spring connector, wherein an upper case is partly omitted. FIG. 43 is a vertical sectional view of the clock spring connector. FIG. 44 is a perspective view illustrating the clock spring connector, wherein the upper case is partly omitted. FIG. 45 is a perspective view depicting a guide member provided in the clock spring connector. A different point of the variant form shown in these Figures from the fifth embodiment is that a guide roller 54 is fixed to the center of the wire spring 51, and simultaneously the bottom plate 7 of the lower case 1 and the top plate 10 of the upper case 2 are formed with recessed grooves 55, 56, each assuming a ring-like configuration in plan, for guiding this roller 54. Other basic constructions are the same. When guiding the wire spring 51 in the peripheral direction of the air space 11 in this way, the wire spring 51 is restricted so as not to move in the radial directions of the air space 11. Thus, it is possible to surely prevent such inconveniences that the first and second rollers 52, 53 come off the flexible cable 3 wound on the inner cylindrical unit 9 when the wire spring 51 moves towards the outer cylindrical unit 8; and reversely when the wire spring 51 moves towards the inner cylindrical unit 9, the pressing forces given from the first and second rollers 52, 53 become insufficient.

Figure 46:
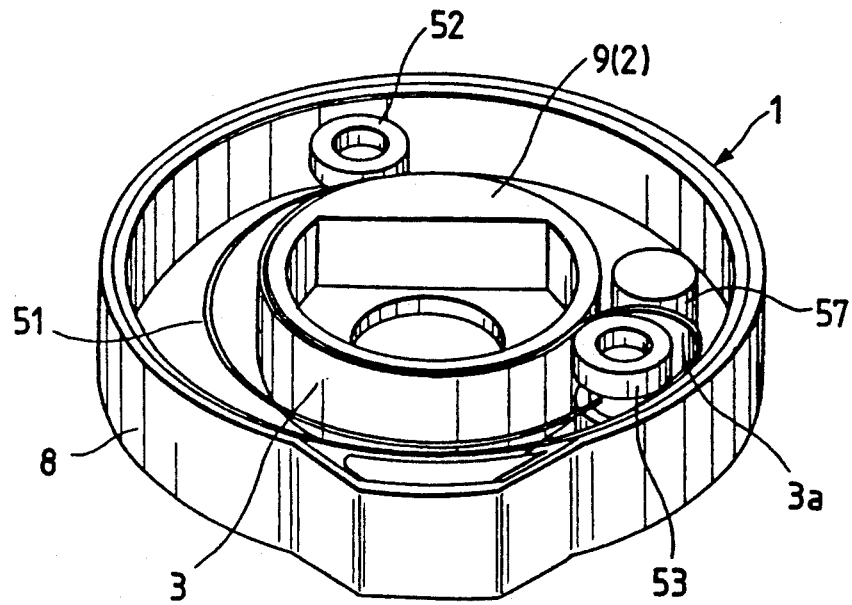
FIG. 46 is a perspective view of the clock spring connector, showing another variant form thereof.
Figure 47:
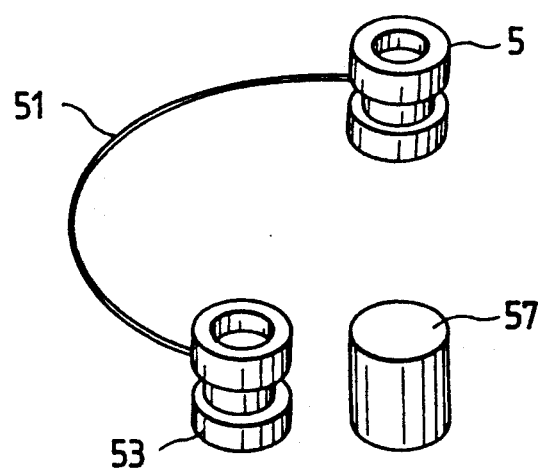
FIG. 47 is a perspective view illustrating a roller group provided in the clock spring connector shown in FIG. 46.

FIG. 46 is a perspective view illustrating the clock spring connector, wherein an upper case is partly omitted. FIG. 47 is a perspective view depicting a group of rollers provided in the clock spring connector. A different point of the variant form shown in these Figures from the fifth embodiment is that an impinging roller 57 is interposed between the turned-back portion 3a of the flexible cable 3 and the first roller 52. Other basic constructions are the same. If constructed in this way, when the upper case 2 rotates clockwise in FIG. 46, the first roller 52 moves in such a direction as to approach the turned-back portion 3a while rotating counterclockwise. At this moment, the first roller 52 presses the turned-back portion 3a through the impinging roller 57, as a result of which the counterclockwise rotations of the first roller 52 are converted into clockwise rotations by means of the impinging roller 46. Namely, the force for feeding out the turned-back portion 3a towards the inner cylindrical unit 9 acts between the turned-back portion 3a and the impinging roller 57 contiguous thereto. The flexible cable can be smoothly fed out towards the inner cylindrical unit 9 through the turned-back portion 3a.

Figure 48:
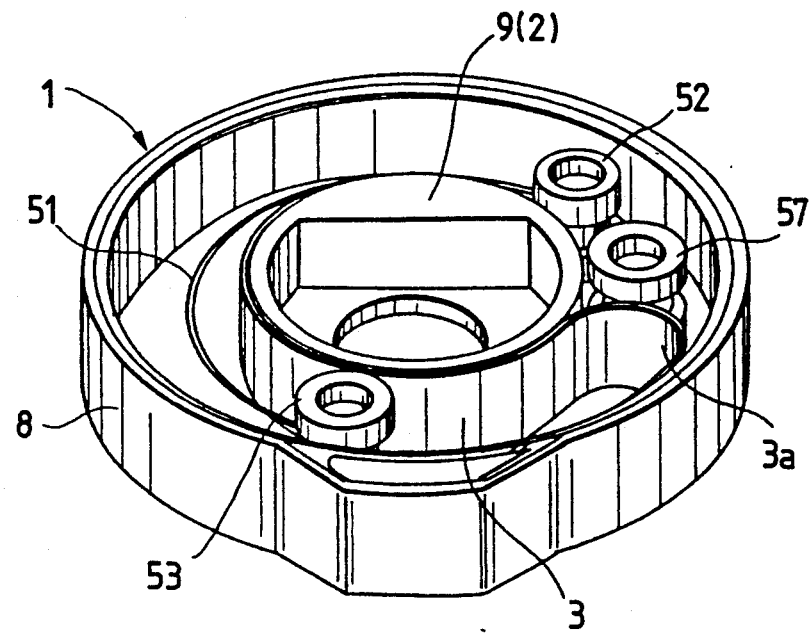
FIG. 48 is a perspective view of the clock spring connector, showing another variant form thereof.
Figure 49:
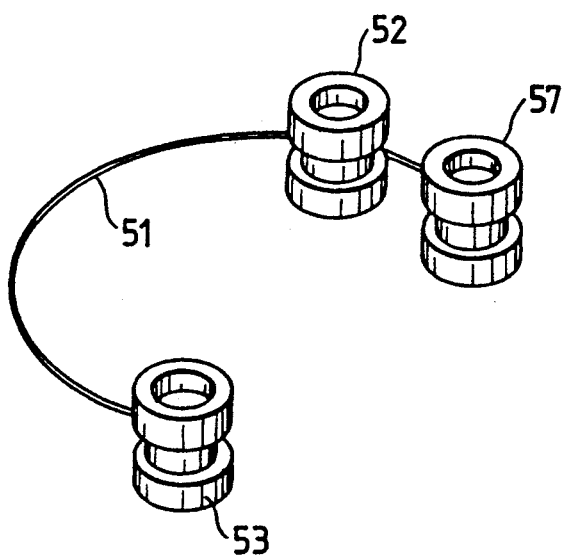
FIG. 49 is a perspective view illustrating a roller group provided in the clock spring connector shown in FIG. 48.

FIG. 48 is a perspective view illustrating the clock spring connector, wherein an upper case is partly omitted. FIG. 49 is a perspective view showing a group of rollers provided in the clock spring connector. A different point of the variant form shown in these Figures from the fifth embodiment is that the impinging roller 57 is secured to one end of the wire spring 51. Other basic constructions are the same. However, the inward elastic biasing force is not imparted to the portion of the wire spring 51 which connects the first roller 52 to the impinging roller 57, so that the impinging roller 57 is not pressed against the inner cylindrical unit 9. According to this variant form, all the rollers including the impinging roller 57 can be connected by the wire spring 51. In addition to the effect of the variant form shown in FIGS. 46 and 47, effects of improving the assembling workability and reducing the noises are exhibited.

Figure 50:
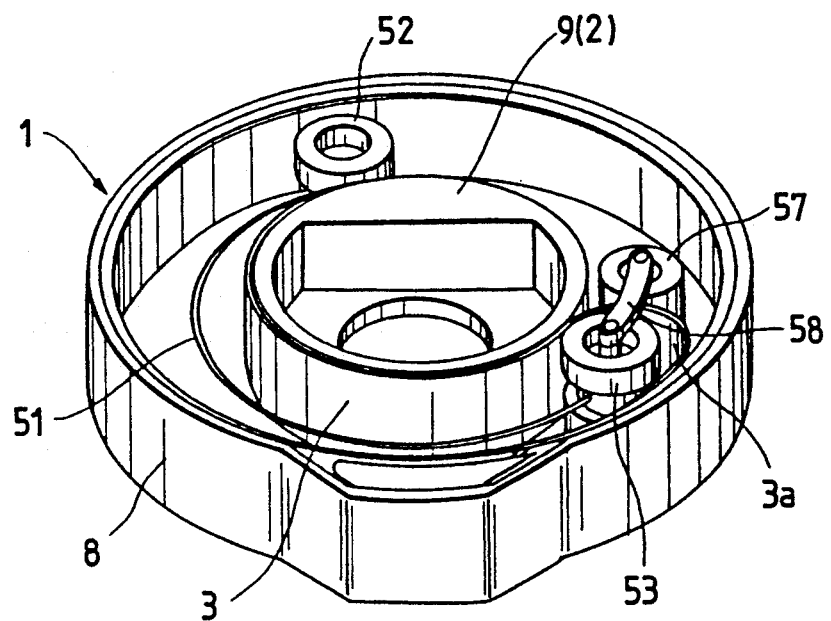
FIG. 50 is a perspective view of the clock spring connector, showing another variant form thereof.
Figure 51:
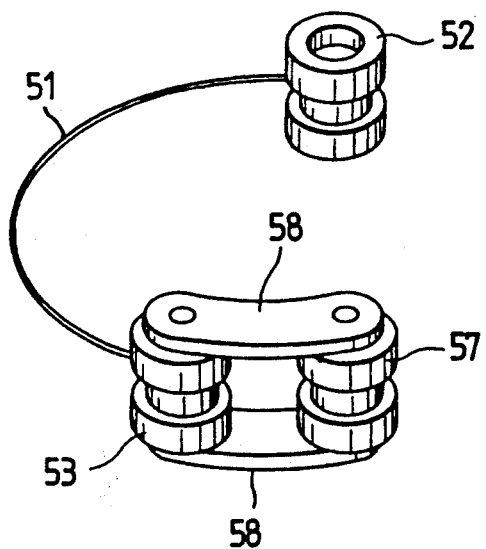
FIG. 51 is a perspective view illustrating a roller group provided in the clock spring connector shown in FIG. 50.

FIG. 50 is a perspective view illustrating the clock spring connector, wherein an upper case is partly omitted. FIG. 51 is a perspective view showing a group of rollers provided in the clock spring connector. A different point of the variant form shown in these Figures from the fifth embodiment is that the impinging roller 57 is connected via a pair of arms 58 to the second roller 53. The turned-back portion 3a of the flexible cable 3 is looped between the second roller 53 and the impinging roller 57. Other basic constructions are the same. According to this variant form, the turned-back portion 3a is looped between the second roller 53 and the impinging roller 57 which are connected through the arms 58. Hence, even when slipping takes place between the first roller 52 and the flexible cable 3, the second roller 53 is able to surely follow up the turned-back portion 3a.

Note that in the respective embodiments discussed above, the flat cable has been exemplified as one example of the flexible cable 3. Instead, however, a flexible cable known as a round cable in which the conductor is covered with an insulating tube is also usable. In this case, a plurality of round cables may be unified in a band like configuration corresponding to the number of circuits required.

Figure 52:
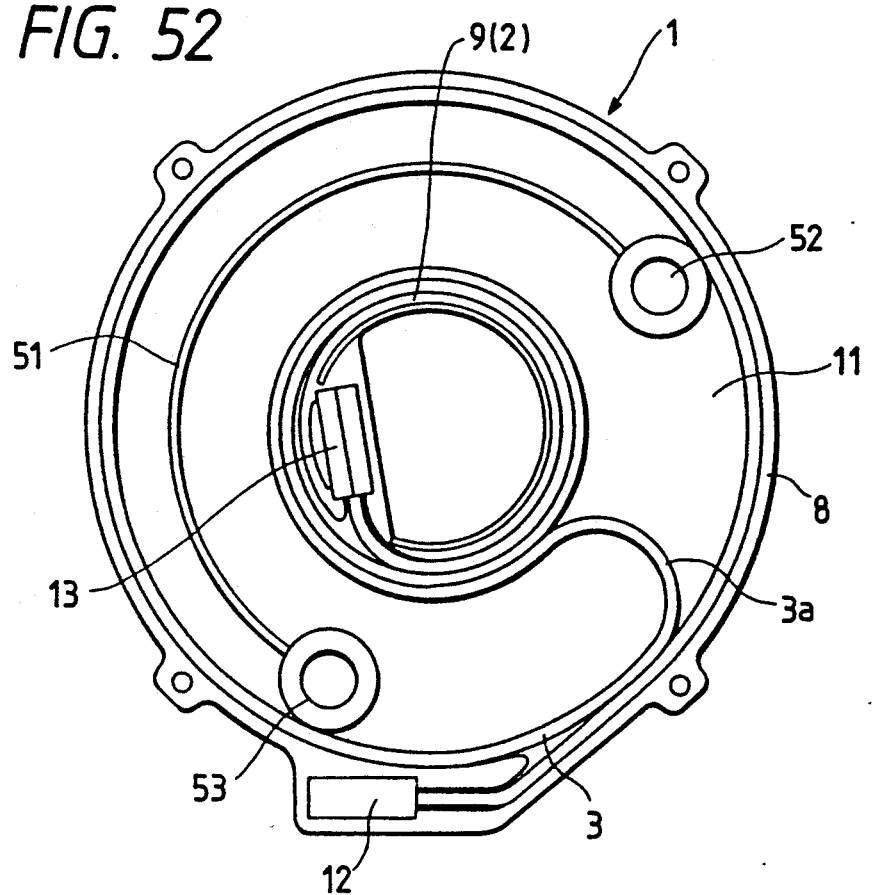
FIG. 52 is a plan view of the clock spring connector, showing other variant form thereof.
Figure 53:
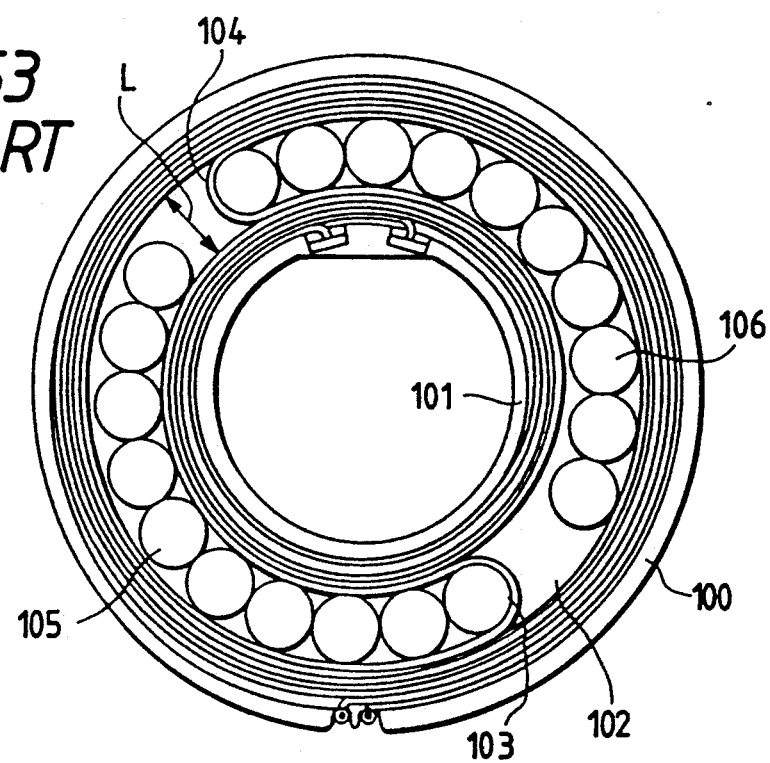
FIG. 53 is a plan view illustrating the clock spring connector in a conventional example.

Further, the respective embodiments discussed above have dealt with the case where the lower case 1 is used as a fixed member, while the upper case is employed as a movable member. In reverse to this arrangement, the upper case is usable as a fixed member, while the lower case 1 is usable as a movable member. Especially in the fifth embodiment, when using the upper case 2 as the fixed member and the lower case 1 as the movable member, as illustrated in FIG. 52, the first and second rollers 52, 53 may be pressed against the inner surface of the outer cylindrical unit 8 by using the wire spring 51 to which an outwardly expanding elastic biasing force is imparted.

Although the illustrative embodiments of the present invention have been described in detail with reference to the accompanying drawings, it is to be understood that the present invention is not limited to those embodiments. Various changes or modifications may be effected therein by one skilled in the art without departing from the scope or spirit of the invention.

What is claimed is:

1. A clock spring connector comprising:
 a fixed member;
 a movable member so mounted as to be rotatable relative to said fixed member; and
 a flexible cable for connecting said fixed member to said movable member, said flexible cable being accommodated in an air space between an inner cylindrical unit provided in any one of said fixed member and said movable member and an outer cylindrical unit provided in said other member and reversely wound on said inner and outer cylindrical units through a U-shaped turned-back portion,
 characterized in that an elastic member is disposed in the air space, said elastic member biasing, in a radially-inward direction, said flexible cable substantially over an entire periphery of the outer peripheral surface of said inner cylindrical unit.

2. The clock spring connector as set forth in claim 1, wherein a plurality of rollers are disposed in the peripheral direction within said air space and connected by said elastic member.

3. The clock spring connector as set forth in claim 2, wherein one of said rollers is looped with said turned-back portion of said flexible cable, and a slide member confronting said roller through said turned-back portion is connected to said roller.

4. The clock spring connector as set forth in claim 1, wherein a moving member formed with an opening is disposed within said air space, and said elastic member is held by said moving member.

5. The clock spring connector as set forth in claim 1, wherein said elastic member is composed of a leaf spring formed in a C-shape.

6. A clock spring connector comprising:
 a fixed member;
 a movable member so mounted as to be rotatable relative to said fixed member; and
 a flexible cable for connecting said fixed member to said movable member, said flexible cable being accommodated in an air space between an inner cylindrical unit provided in any one of said fixed member and said movable member and an outer cylindrical unit provided in said other member and reversely wound on said inner and outer cylindrical units through a U-shaped turned-back portion,
 characterized in that an elastic member is disposed in the air space, said elastic member biasing, in a radially-outward direction, said flexible cable substantially over an entire periphery of the inner peripheral surface of said outer cylindrical unit.

7. The clock spring connector as set forth in claim 6, wherein a plurality of rollers are disposed in the peripheral direction within said air space and connected by said elastic member.

8. The clock spring connector as set forth in claim 7, wherein one of said rollers is looped with said turned-back portion of said flexible cable, and a slide member confronting said roller through said turned-back portion is connected to said roller.

9. The clock spring connector as set forth in claim 6, wherein a moving member formed with an opening is disposed within said air space, and said elastic member is held by said moving member.

10. The clock spring connector as set forth in claim 6, wherein said elastic member is composed of a leaf spring formed in a C-shape.

11. A clock spring connector comprising:
 a fixed member;
 a movable member so mounted as to be rotatable relative to said fixed member; and
 a flexible cable for connecting said fixed member to said movable member, said flexible cable being accommodated in an air space between an inner cylindrical unit provided in any one of said fixed member and said movable member and an outer cylindrical unit provided in said other member and reversely wound on said inner and outer cylindrical units through a U-shaped turned-back portion,
 characterized in that an elastic member is disposed in the air space, said elastic member biasing, in a radially-inward direction, said flexible cable substantially over entire periphery of the outer peripheral surface of said inner cylindrical unit and said elastic member biasing, in a radially-outward direction, said flexible cable substantially over entire periphery of the inner peripheral surface of said outer cylindrical unit.

12. The clock spring connector as set forth in claim 11, wherein a moving member formed with an opening is disposed within said air space, and said elastic member is held by said moving member.

13. The clock spring connector as set forth in claim 12, wherein a plurality of groups of rollers are provided on the inner and outer peripheries of said moving member, and wherein said elastic member is provided on said moving member for biasing the roller groups on the inner periphery towards said inner cylindrical unit and for biasing the roller groups on the outer periphery towards said outer cylindrical unit.

14. A clock spring connector as set forth in claim 12 or 13, wherein said turned-back portion of said flexible cable is looped on one end of said moving member and wherein a slide member confronting said turned-back portion of said flexible cable is connected to one end of said moving member through said turned-back portion.

15. The clock spring connector as set forth in claim 11, wherein said elastic member includes a pair of leaf springs formed in a C-shape, one of said leaf springs being resiliently biased to expand outward while the other of said leaf springs is resiliently biased to contract inwardly.

16. A clock spring connector comprising:
a fixed member;
a movable member so mounted as to be rotatable relative to said fixed member; and
a flexible cable for connecting said fixed member to said movable member, said flexible cable being accommodated in an air space between an inner cylindrical unit provided in any one of said fixed member and said movable member and an outer cylindrical unit provided in said other member and reversely wound on said inner and outer cylindrical units through a U-shaped turned-back portion, characterized in that an elastic member for biasing said turned-back portion outwards is disposed inwardly of said turned-back portion.

17. The clock spring connector as set forth in claim 16, wherein a moving member confronting said elastic member is connected to said elastic member.

18. A clock spring connector comprising:
a fixed member including a first cylindrical unit;
a movable member including a second cylindrical unit and so mounted as to be rotatable relative to said fixed member; and
a flexible cable for connecting said fixed member to said movable member, said flexible cable being reversely wound on said first and second cylindrical units through a U-shaped turned-back portion, characterized in that first and second press members are disposed between said flexible cable wound on said first cylindrical unit and said flexible cable wound on said second cylindrical unit while keeping a predetermined interval in the peripheral direction, and said first and second press members are connected through an elastic member by which said first and second press members are press-biased to the peripheral surface of said second cylindrical unit.

19. The clock spring connector as set forth in claim 18, wherein at least one of said press member of said first and second press members which confronts the inside of said turned-back portion is a roller.

20. The clock spring connector as set forth in claim 18 or 19, further comprising a guide means for guiding said elastic member in the peripheral direction.

21. The clock spring connector as set forth in any one of claims 18 to 19, wherein an impinging member which is not press-biased to the peripheral surface of said second cylindrical unit is interposed between any one of said first and second press members and the outside of said turned-back portion.

22. The clock spring connector as set forth in claim 20, wherein an impinging member which is not press-biased to the peripheral surface of said second cylindrical unit is interposed between any one of said first and second press members and the outside of said turned-back portion.

* * * * *